United States Patent
Yin et al.

(10) Patent No.: US 12,156,245 B2
(45) Date of Patent: Nov. 26, 2024

(54) COLLISION HANDLING BETWEEN MULTIPLE HIGH PRIORITY PUCCHS WITH HARQ-ACK AND SR AND A LOW PRIORITY PUCCH WITH HARQ-ACK

(71) Applicant: Sharp Kabushiki Kaisha, Sakai (JP)

(72) Inventors: Zhanping Yin, Vancouver, WA (US); Kai Ying, Vancouver, WA (US); Kazunari Yokomakura, Vancouver, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 509 days.

(21) Appl. No.: 17/589,286

(22) Filed: Jan. 31, 2022

(65) Prior Publication Data
US 2023/0224950 A1   Jul. 13, 2023

Related U.S. Application Data

(60) Provisional application No. 63/298,048, filed on Jan. 10, 2022.

(51) Int. Cl.
| | |
|---|---|
| H04W 72/566 | (2023.01) |
| H04L 1/1812 | (2023.01) |
| H04L 5/00 | (2006.01) |
| H04W 72/1268 | (2023.01) |
| H04W 72/20 | (2023.01) |

(52) U.S. Cl.
CPC ......... *H04W 72/569* (2023.01); *H04L 1/1812* (2013.01); *H04L 5/0053* (2013.01); *H04W 72/1268* (2013.01); *H04W 72/20* (2023.01)

(58) Field of Classification Search
None
See application file for complete search history.

(56) References Cited

U.S. PATENT DOCUMENTS

2024/0188084 A1* 6/2024 Choi ..................... H04L 1/0004

OTHER PUBLICATIONS

NTT Docomo, Inc., "Discussion on intra-UE multiplexing/prioritization for Rel. 17 URLLC", 3GPP TSG RAN WG1 #107-e, R1-2112103, Nov. 19, 2021.
Sharp, "Enhancements on intra-UE UCI multiplexing and channel collision resolution framework", 3GPP TSG RAN WG1 #107-e, R1-2112014, Nov. 19, 2021.

* cited by examiner

*Primary Examiner* — Walter J Divito
(74) *Attorney, Agent, or Firm* — Austin Rapp

(57) ABSTRACT

A user equipment (UE) is described. The UE includes circuitry configured to determine that a physical uplink control channel (PUCCH) with low priority (LP) overlaps with a high priority (HP) PUCCH carrying a HP hybrid automatic repeat request-acknowledgement (HARQ-ACK) and a HP PUCCH with a positive HP scheduling request (SR). The HP PUCCH with HP HARQ-ACK does not overlap with the HP PUCCH with the positive HP SR. The circuitry is further configured to multiplex a LP HARQ-ACK only with the HP HARQ-ACK.

8 Claims, 13 Drawing Sheets

COLLISION HANDLING BETWEEN MULTIPLE HIGH PRIORITY PUCCHS WITH HARQ-ACK AND SR AND A LOW PRIORITY PUCCH WITH HARQ-ACK

RELATED APPLICATIONS

This application is related to and claims priority from U.S. Provisional Patent Application No. 63/298,048, entitled "COLLISION HANDLING BETWEEN MULTIPLE HIGH PRIORITY PUCCHs WITH HARQ-ACK AND SR AND A LOW PRIORITY PUCCH WITH HARQ-ACK," filed on Jan. 10, 2022, which is hereby incorporated by reference herein, in its entirety.

TECHNICAL FIELD

The present disclosure relates generally to communication systems. More specifically, the present disclosure relates to enhancements on collision handling between multiple high priority PUCCHs with HARQ-ACK and SR and a low priority PUCCH with HARQ-ACK.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility, and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
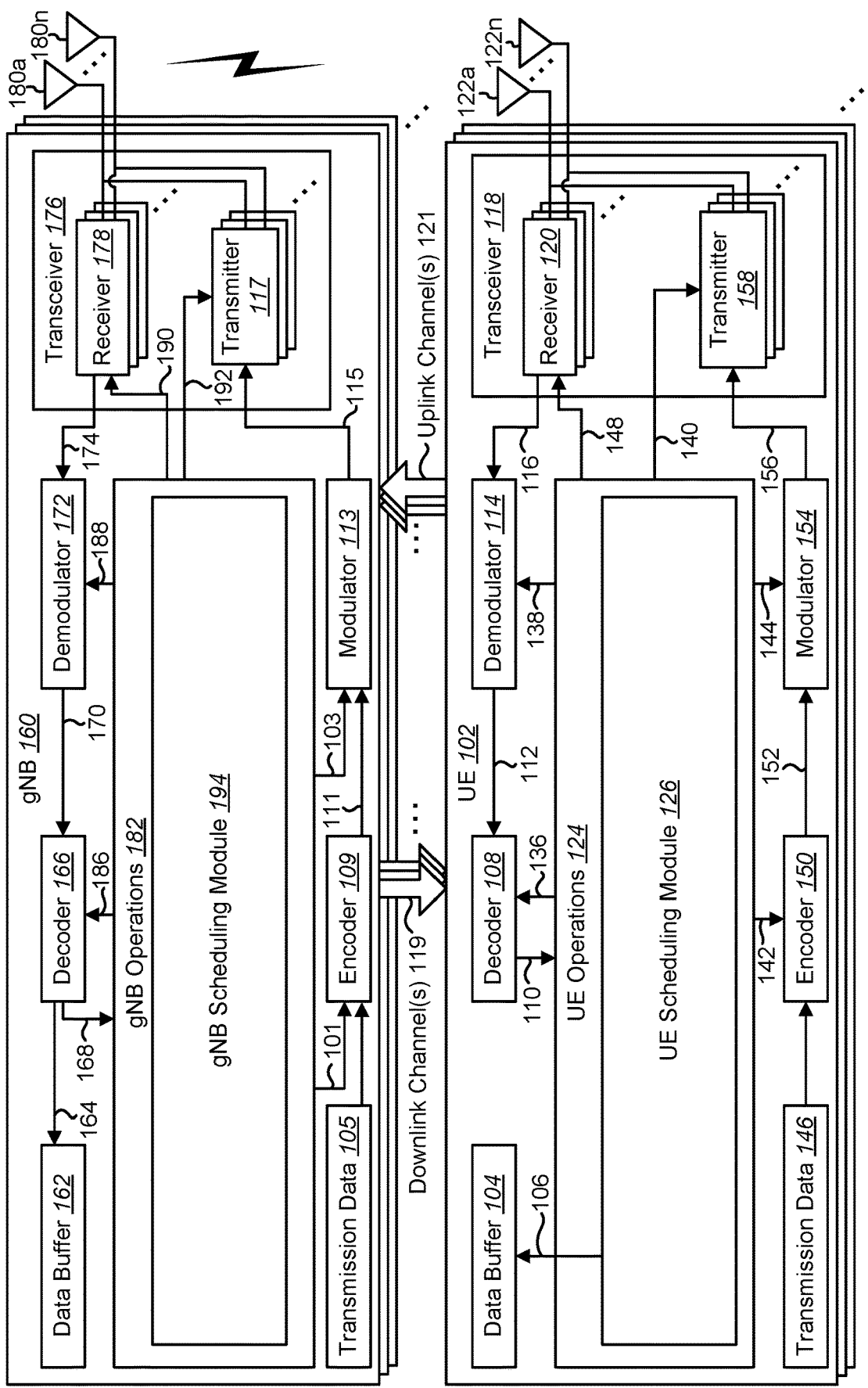
FIG. 1 is a block diagram illustrating one implementation of one or more gNBs 160 and one or more UEs 102 in which systems and methods for channel dropping behaviors may be implemented.

A user equipment (UE) is described. The UE may include circuitry configured to determine that a physical uplink control channel (PUCCH) with low priority (LP) carrying a LP hybrid automatic repeat request-acknowledgement (HARQ-ACK) overlaps with more than one high priority (HP) PUCCHs carrying HP HARQ-ACKs. The circuitry may also be configured to, when only radio resource control (RRC) configuration is used for enabling and disabling uplink control information (UCI) with different priorities, allow the LP HARQ-ACK to multiplex with the HP HARQ-ACK of the first overlapping HP PUCCH only.

In another example, the UE may include circuitry configured to determine that a physical uplink control channel (PUCCH) with low priority (LP) carrying a LP hybrid automatic repeat request-acknowledgement (HARQ-ACK) overlaps with more than one high priority (HP) PUCCHs carrying HP HARQ-ACKs. The circuitry may also be configured to, when explicit dynamic downlink control information (DCI) indication is supported for multiplexing of uplink control information (UCI) with different priorities, allow dynamic DCI indication in a scheduling DCI of a last HP physical downlink shared channel (PDSCH) of an earliest overlapping HP PUCCH for HP HARQ-ACK only.

Further, the UE may include circuitry configured to determine that a physical uplink control channel (PUCCH) with low priority (LP) carrying a LP hybrid automatic repeat request-acknowledgement (HARQ-ACK) overlaps with more than one high priority (HP) PUCCHs carrying HP HARQ-ACKs. The circuitry may also be configured to, when explicit dynamic downlink control information (DCI) indication is supported for multiplexing of uplink control information (UCI) with different priorities, allow dynamic DCI indication in a scheduling DCI of a last HP physical downlink shared channel (PDSCH) of any one of the overlapping HP PUCCH for HP HARQ-ACK.

In some examples, the UE may include circuitry configured to determine that a physical uplink control channel (PUCCH) with low priority (LP) carrying a LP hybrid automatic repeat request-acknowledgement (HARQ-ACK) overlaps with more than one high priority (HP) PUCCHs carrying HP HARQ-ACKs. The circuitry may also be configured to, when explicit dynamic downlink control information (DCI) indication is supported for multiplexing of uplink control information (UCI) with different priorities, include dynamic DCI indications in a scheduling DCI of a last LP physical downlink shared channel (PDSCH) corresponding to the LP HARQ-ACK in the LP PUCCH and in a scheduling DCI of a last HP PDSCH corresponding to the HP HARQ-ACK in an overlapping HP PUCCH.

A base station (gNB) is described. The gNB may include circuitry configured to determine that a physical uplink control channel (PUCCH) with low priority (LP) carrying a LP hybrid automatic repeat request-acknowledgement (HARQ-ACK) overlaps with more than one high priority (HP) PUCCHs carrying HP HARQ-ACKs. The circuitry may also be configured to, when only radio resource control (RRC) configuration is used for enabling and disabling uplink control information (UCI) with different priorities, multiplex the LP HARQ-ACK with the HP HARQ-ACK of the first overlapping HP PUCCH only.

In another example, the gNB may include circuitry configured to determine that a physical uplink control channel (PUCCH) with low priority (LP) carrying a LP hybrid automatic repeat request-acknowledgement (HARQ-ACK) overlaps with more than one high priority (HP) PUCCHs carrying HP HARQ-ACKs. The circuitry may also be configured to, when explicit dynamic downlink control information (DCI) indication is supported for multiplexing of uplink control information (UCI) with different priorities, allow dynamic DCI indication in a scheduling DCI of a last HP physical downlink shared channel (PDSCH) of an earliest overlapping HP PUCCH for HP HARQ-ACK only.

Further, the gNB may include circuitry configured to determine that a physical uplink control channel (PUCCH) with low priority (LP) carrying a LP hybrid automatic repeat request-acknowledgement (HARQ-ACK) overlaps with more than one high priority (HP) PUCCHs carrying HP HARQ-ACKs. The circuitry may also be configured to, when explicit dynamic downlink control information (DCI) indication is supported for multiplexing of uplink control information (UCI) with different priorities, allow dynamic DCI indication in a scheduling DCI of a last HP physical downlink shared channel (PDSCH) of any one of the overlapping HP PUCCH for HP HARQ-ACK.

In a yet further example, the gNB may include circuitry configured to determine that a physical uplink control channel (PUCCH) with low priority (LP) carrying a LP hybrid automatic repeat request-acknowledgement (HARQ-ACK) overlaps with more than one high priority (HP) PUCCHs carrying HP HARQ-ACKs. The circuitry may also be configured to, when explicit dynamic downlink control information (DCI) indication is supported for multiplexing of uplink control information (UCI) with different priorities, include dynamic DCI indications in a scheduling DCI of a last LP physical downlink shared channel (PDSCH) corresponding to the LP HARQ-ACK in the LP PUCCH and in a scheduling DCI of a last HP PDSCH corresponding to the HP HARQ-ACK in an overlapping HP PUCCH.

Another user equipment (UE) is described. The UE may include circuitry configured to determine that a physical uplink control channel (PUCCH) with low priority (LP) overlaps with a high priority (HP) PUCCH carrying a HP hybrid automatic repeat request-acknowledgement (HARQ-ACK) and a HP PUCCH with a positive HP scheduling request (SR), wherein the HP PUCCH with HP HARQ-ACK does not overlap with the HP PUCCH with the positive HP SR. The circuitry may also be configured to multiplex a LP HARQ-ACK only with the HP HARQ-ACK.

In some examples, the UE may include circuitry configured to determine that a physical uplink control channel (PUCCH) with low priority (LP) overlaps with a high priority (HP) PUCCH carrying a HP hybrid automatic repeat request-acknowledgement (HARQ-ACK) and a HP PUCCH with a positive HP scheduling request (SR), wherein the HP PUCCH with HP HARQ-ACK does not overlap with the HP PUCCH with the positive HP SR. The circuitry may also be configured to multiplex, based on a timeline, a LP HARQ-ACK with an uplink control information (UCI) of an earliest overlapping HP PUCCH.

In some aspects, the UE may include circuitry configured to determine that a physical uplink control channel (PUCCH) with low priority (LP) overlaps with a high priority (HP) PUCCH carrying a HP hybrid automatic repeat request-acknowledgement (HARQ-ACK) and a HP PUCCH with a positive HP scheduling request (SR), wherein the HP PUCCH with HP HARQ-ACK does not overlap with the HP PUCCH with the positive HP SR. The circuitry may also be configured to multiplex, based on an LP HARQ-ACK payload and a PUCCH format for the positive HP SR, the LP HARQ-ACK on an HP SR PUCCH resource if there is up to 2 bits of LP HARQ-ACK and if multiplexing for a PUCCH combination between LP HARQ-ACK and HP SR is supported. The circuitry may also be configured to multiplex the LP HARQ-ACK with the HP HARQ-ACK on an HP PUCCH resource if there is more than 2 bits of LP HARQ-ACK or if multiplexing for a PUCCH combination between LP HARQ-ACK and HP SR is not supported.

In a further example, the UE may include circuitry configured to determine that a physical uplink control channel (PUCCH) with low priority (LP) overlaps with a high priority (HP) PUCCH carrying a HP hybrid automatic repeat request-acknowledgement (HARQ-ACK) and a HP PUCCH with a positive HP scheduling request (SR), wherein the HP PUCCH with HP HARQ-ACK does not overlap with the HP PUCCH with the positive HP SR. The circuitry may also be configured to multiplex, if downlink control information (DCI) indicates enabling of multiplexing with a HP HARQ-ACK on an overlapping HP PUCCH for HARQ-ACK, the LP HARQ-ACK with the indicated HP HARQ-ACK. The circuitry may also be configured to multiplex, if downlink control information (DCI) does not indicate enabling of multiplexing with a HP HARQ-ACK on an overlapping HP PUCCH for HARQ-ACK, the LP HARQ-ACK with the HP SR.

Another base station (gNB) is described. The gNB may include circuitry configured to determine that a physical uplink control channel (PUCCH) with low priority (LP) overlaps with a high priority (HP) PUCCH carrying a HP hybrid automatic repeat request-acknowledgement (HARQ-ACK) and a HP PUCCH with a positive HP scheduling request (SR), wherein the HP PUCCH with HP HARQ-ACK does not overlap with the HP PUCCH with the positive HP SR. The circuitry may also be configured to multiplex a LP HARQ-ACK only with the HP HARQ-ACK.

In another example, the gNB may include circuitry configured to determine that a physical uplink control channel (PUCCH) with low priority (LP) overlaps with a high priority (HP) PUCCH carrying a HP hybrid automatic repeat request-acknowledgement (HARQ-ACK) and a HP PUCCH with a positive HP scheduling request (SR), wherein the HP PUCCH with HP HARQ-ACK does not overlap with the HP PUCCH with the positive HP SR. The circuitry may also be configured to multiplex, based on a timeline, a LP HARQ-ACK with an uplink control information (UCI) of an earliest overlapping HP PUCCH.

Further, the gNB may include circuitry configured to determine that a physical uplink control channel (PUCCH) with low priority (LP) overlaps with a high priority (HP) PUCCH carrying a HP hybrid automatic repeat request-acknowledgement (HARQ-ACK) and a HP PUCCH with a positive HP scheduling request (SR), wherein the HP PUCCH with HP HARQ-ACK does not overlap with the HP PUCCH with the positive HP SR. The circuitry may also be configured to multiplex, based on an LP HARQ-ACK payload and a PUCCH format for the positive HP SR, the LP HARQ-ACK on an HP SR PUCCH resource if there is up to 2 bits of LP HARQ-ACK and if a PUCCH combination is supported. The circuitry may also be configured to multiplex the LP HARQ-ACK with the HP HARQ-ACK on an HP PUCCH resource if there is not up to 2 bits of LP HARQ-ACK or if a PUCCH combination is not supported.

In a still yet further example, the gNB may include circuitry configured to determine that a physical uplink control channel (PUCCH) with low priority (LP) overlaps with a high priority (HP) PUCCH carrying a HP hybrid automatic repeat request-acknowledgement (HARQ-ACK) and a HP PUCCH with a positive HP scheduling request (SR), wherein the HP PUCCH with HP HARQ-ACK does not overlap with the HP PUCCH with the positive HP SR. The circuitry may also be configured to multiplex, if downlink control information (DCI) indicates enabling of multiplexing with a HP HARQ-ACK on an overlapping HP PUCCH for HARQ-ACK, the LP HARQ-ACK with the indicated HP HARQ-ACK. The circuitry may also be configured to multiplex, if downlink control information (DCI) does not indicate enabling of multiplexing with a HP HARQ-ACK on an overlapping HP PUCCH for HARQ-ACK, the LP HARQ-ACK with the HP SR.

The 3rd Generation Partnership Project, also referred to as "3GPP," is a collaboration agreement that aims to define globally applicable technical specifications and technical reports for third, fourth, and fifth generation wireless communication systems. The 3GPP may define specifications for next generation mobile networks, systems, and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and/or other standards (e.g., 3GPP Releases 8, 9, 10, 11, 12, 13, 14, 15, 16, 17, etc.). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and/or "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB and/or gNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio," "New Radio Access Technology" or "NR" by 3GPP) envisions the use of time/frequency/space resources to allow for enhanced mobile broadband (eMBB) communication and ultra-reliable low-latency communication (URLLC) services, as well as massive machine type communication (MMTC) like services. A new radio (NR) base station may be referred to as a gNB. A gNB may also be more generally referred to as a base station or base station device.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for channel dropping behaviors may be implemented. The one or more UEs 102 communicate with one or more gNBs 160 using one or more antennas 122a-n. For example, a UE 102 transmits electromagnetic signals to the gNB 160 and receives electromagnetic signals from the gNB 160 using the one or more antennas 122*a-n*. The gNB 160 communicates with the UE 102 using one or more antennas 180*a-n*.

The UE 102 and the gNB 160 may use one or more channels 119, 121 to communicate with each other. For example, a UE 102 may transmit information or data to the gNB 160 using one or more uplink channels 121. Examples of uplink channels 121 include a PUCCH (Physical Uplink Control Channel) and a PUSCH (Physical Uplink Shared Channel), PRACH (Physical Random Access Channel), etc. For example, uplink channels 121 (e.g., PUSCH) may be used for transmitting UL data (i.e., Transport Block(s), MAC PDU, and/or UL-SCH (Uplink-Shared Channel)).

In some examples, UL data may include URLLC data. The URLLC data may be UL-SCH data. Here, URLLC-PUSCH (i.e., a different Physical Uplink Shared Channel from PUSCH) may be defined for transmitting the URLLC data. For the sake of simple description, the term "PUSCH" may mean any of (1) only PUSCH (e.g., regular PUSCH, non-URLLC-PUSCH, etc.), (2) PUSCH or URLLC-PUSCH, (3) PUSCH and URLLC-PUSCH, or (4) only URLLC-PUSCH (e.g., not regular PUSCH).

Also, for example, uplink channels 121 may be used for transmitting Hybrid Automatic Repeat Request-ACK (HARQ-ACK), Channel State Information (CSI), and/or Scheduling Request (SR) signals. The HARQ-ACK may include information indicating a positive acknowledgment (ACK) or a negative acknowledgment (NACK) for DL data (i.e., Transport Block(s), Medium Access Control Protocol Data Unit (MAC PDU), and/or DL-SCH (Downlink-Shared Channel)).

The CSI may include information indicating a channel quality of downlink. The SR may be used for requesting UL-SCH (Uplink-Shared Channel) resources for new transmission and/or retransmission. For example, the SR may be used for requesting UL resources for transmitting UL data.

The one or more gNB s 160 may also transmit information or data to the one or more UEs 102 using one or more downlink channels 119, for instance. Examples of downlink channels 119 include a PDCCH, a PDSCH, etc. Other kinds of channels may be used. The PDCCH may be used for transmitting Downlink Control Information (DCI).

Each of the one or more UEs 102 may include one or more transceivers 118, one or more demodulators 114, one or more decoders 108, one or more encoders 150, one or more modulators 154, a data buffer 104, and a UE operations module 124. For example, one or more reception and/or transmission paths may be implemented in the UE 102. For convenience, only a single transceiver 118, decoder 108, demodulator 114, encoder 150, and modulator 154 are illustrated in the UE 102, though multiple parallel elements (e.g., transceivers 118, decoders 108, demodulators 114, encoders 150, and modulators 154) may be implemented.

The transceiver 118 may include one or more receivers 120 and one or more transmitters 158. The one or more receivers 120 may receive signals from the gNB 160 using one or more antennas 122*a-n*. For example, the receiver 120 may receive and downconvert signals to produce one or more received signals 116. The one or more received signals 116 may be provided to a demodulator 114. The one or more transmitters 158 may transmit signals to the gNB 160 using one or more antennas 122*a-n*. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include a UE scheduling module 126. In some examples, the UE scheduling module 126 may be utilized to perform joint coding and/or multiplexing of deferred SPS HARQ-ACK as described herein. For instance, the UE 102, the UE operations module 124, and/or the UE scheduling module 126 may perform one or more of the methods, operations, functions, approaches, and/or examples described herein.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162, and a gNB operations module 182. For example, one or more reception and/or transmission paths may be implemented in a gNB 160. For convenience, only a single transceiver 176, decoder 166, demodulator 172, encoder 109, and modulator 113 are illustrated in the gNB 160, though multiple parallel elements (e.g., transceivers 176, decoders 166, demodulators 172, encoders 109, and modulators 113) may be implemented.

The transceiver 176 may include one or more receivers 178 and one or more transmitters 117. The one or more receivers 178 may receive signals from the UE 102 using one or more antennas 180*a-n*. For example, the receiver 178 may receive and downconvert signals to produce one or more received signals 174. The one or more received signals 174 may be provided to a demodulator 172. The one or more transmitters 117 may transmit signals to the UE 102 using one or more antennas 180*a-n*. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include a gNB scheduling module 194. The gNB scheduling module 194 may perform operations as described herein. In some examples, the gNB scheduling module 194 may be utilized to configure dropping and/or puncturing procedures and/or to receive communications from a UE in accordance with the dropping and/or puncturing procedures described herein. For instance, the gNB 160, the gNB operations module 182, and/or the gNB scheduling module 194 may receive transmissions from the UE in accordance with one or more of the methods, operations, functions, approaches, and/or examples described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
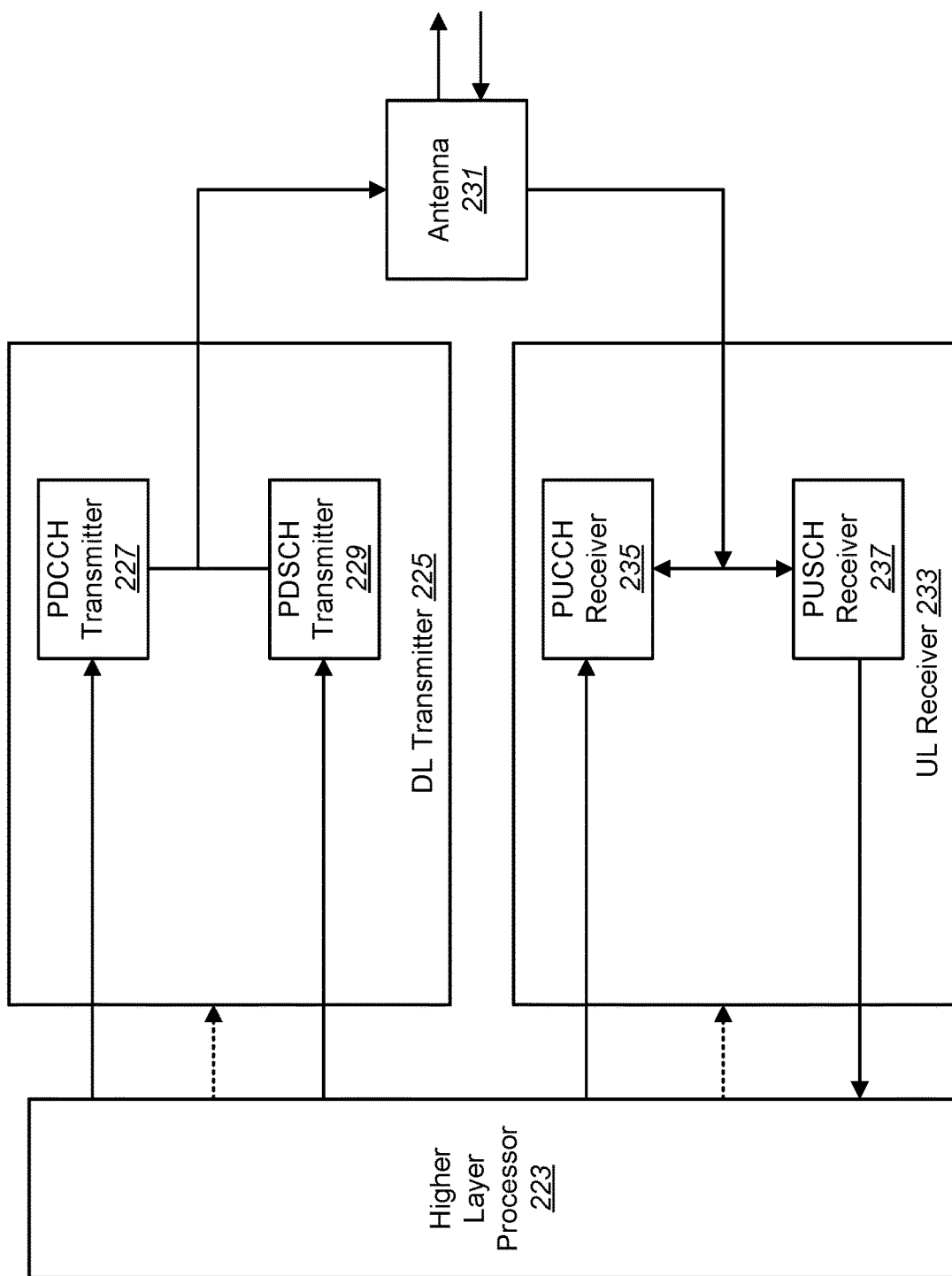
FIG. 2 is a block diagram illustrating one implementation of a gNB.

FIG. 2 is a block diagram illustrating one implementation of a gNB 260. The gNB 260 may be implemented in accordance with the gNB 160 described in connection with FIG. 1 in some examples, and/or may perform one or more of the functions described herein. The gNB 260 may include a higher layer processor 223, a DL transmitter 225, a UL receiver 233, and one or more antenna 231. The DL transmitter 225 may include a PDCCH transmitter 227 and a PDSCH transmitter 229. The UL receiver 233 may include a PUCCH receiver 235 and a PUSCH receiver 237.

The higher layer processor 223 may manage physical layer's behaviors (the DL transmitter's and the UL receiver's behaviors) and provide higher layer parameters to the physical layer. The higher layer processor 223 may obtain transport blocks from the physical layer. The higher layer processor 223 may send/acquire higher layer messages such as an RRC message and MAC message to/from a UE's higher layer. The higher layer processor 223 may provide the PDSCH transmitter transport blocks and provide the PDCCH transmitter transmission parameters related to the transport blocks.

The DL transmitter 225 may multiplex downlink physical channels and downlink physical signals (including reservation signal) and transmit them via transmission antennas 231. The UL receiver 233 may receive multiplexed uplink physical channels and uplink physical signals via receiving antennas 231 and de-multiplex them. The PUCCH receiver 235 may provide the higher layer processor 223 UCI. The PUSCH receiver 237 may provide the higher layer processor 223 received transport blocks.

Figure 3:
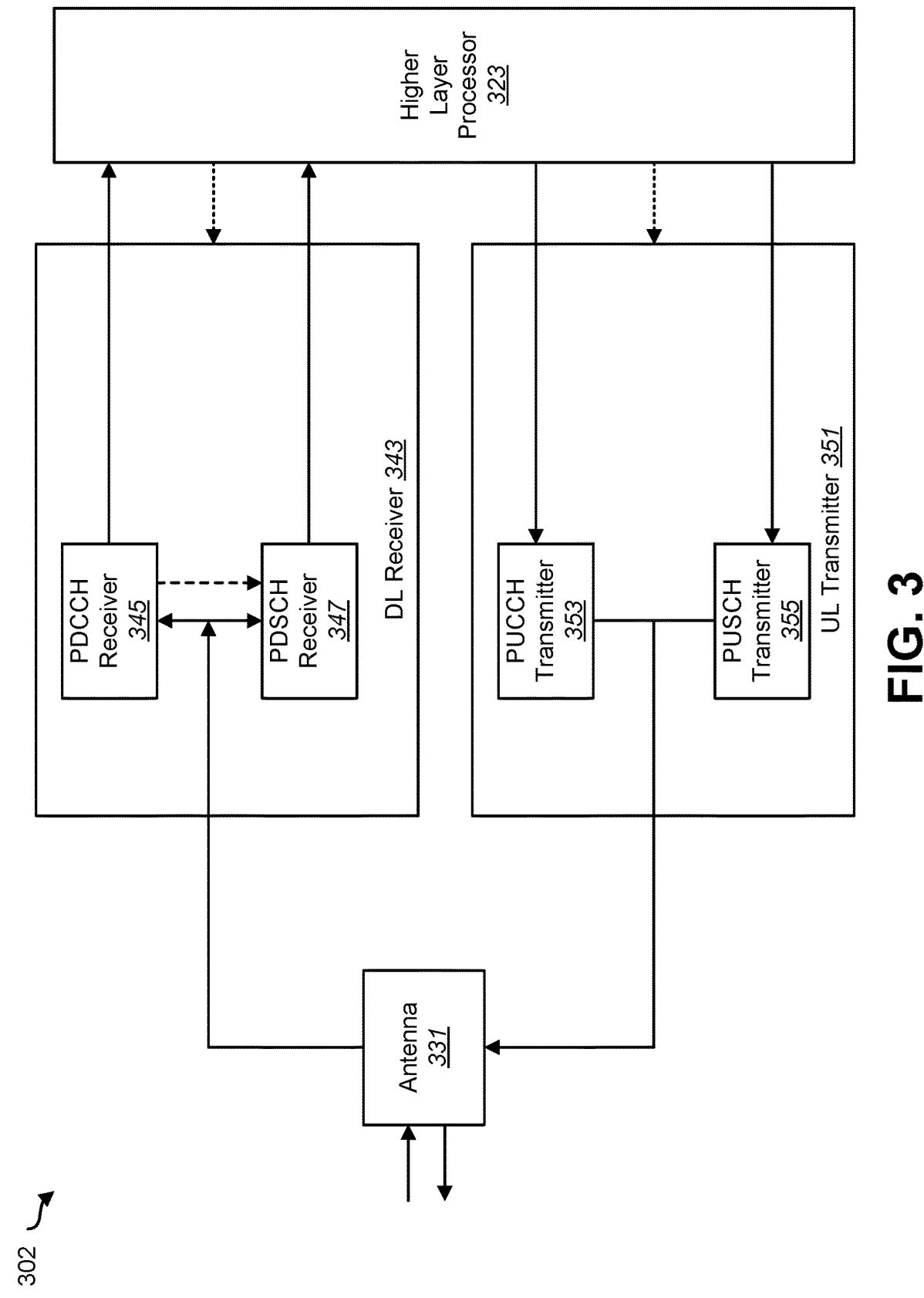
FIG. 3 is a block diagram illustrating one implementation of a UE.

FIG. 3 is a block diagram illustrating one implementation of a UE 302. The UE 302 may be implemented in accordance with the UE 102 described in connection with FIG. 1 in some examples, and/or may perform one or more of the functions described herein. The UE 302 may include a higher layer processor 323, a UL transmitter 351, a DL receiver 343, and one or more antenna 331. The UL transmitter 351 may include a PUCCH transmitter 353 and a PUSCH transmitter 355. The DL receiver 343 may include a PDCCH receiver 345 and a PDSCH receiver 347.

The higher layer processor 323 may manage physical layer's behaviors (the UL transmitter's and the DL receiver's behaviors) and provide higher layer parameters to the physical layer. The higher layer processor 323 may obtain transport blocks from the physical layer. The higher layer processor 323 may send/acquire higher layer messages such as an RRC message and MAC message to/from a UE's higher layer. The higher layer processor 323 may provide the PUSCH transmitter transport blocks and provide the PUCCH transmitter 353 UCI.

The DL receiver 343 may receive multiplexed downlink physical channels and downlink physical signals via receiving antennas 331 and de-multiplex them. The PDCCH receiver 345 may provide the higher layer processor 323 DCI. The PDSCH receiver 347 may provide the higher layer processor 323 received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 4:
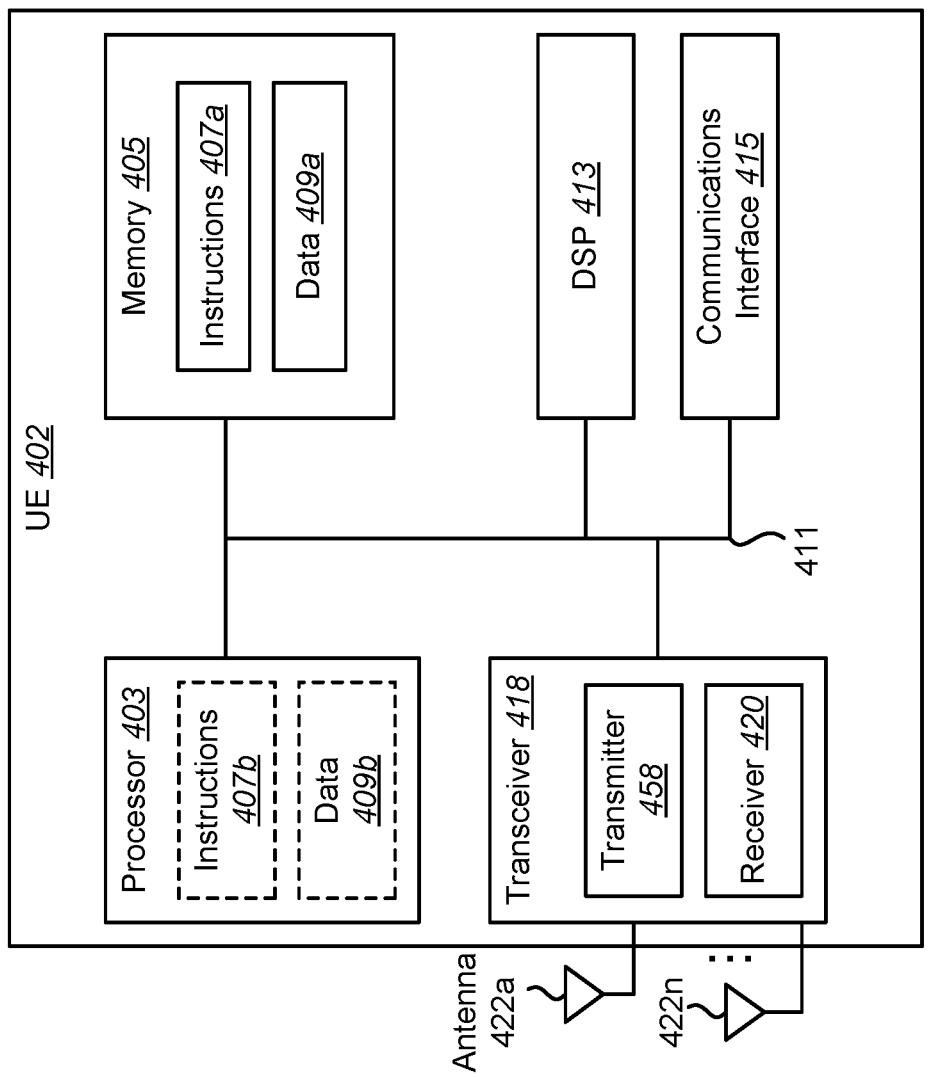
FIG. 4 illustrates various components that may be utilized in a UE.

FIG. 4 illustrates various components that may be utilized in a UE 402. The UE 402 described in connection with FIG. 4 may be implemented in accordance with the UE 102 described in connection with FIG. 1. In some examples, the UE 402 may perform one or more of the methods, functions, operations, and/or examples, etc., described herein. The UE 402 includes a processor 403 that controls operation of the UE 402. The processor 403 may also be referred to as a central processing unit (CPU). Memory 405, which may include read-only memory (ROM), random access memory (RAM), a combination of the two or any type of device that may store information, provides instructions 407a and data 409a to the processor 403. A portion of the memory 405 may also include non-volatile random-access memory (NVRAM). Instructions 407b and data 409b may also reside in the processor 403. Instructions 407b and/or data 409b loaded into the processor 403 may also include instructions 407a and/or data 409a from memory 405 that were loaded for execution or processing by the processor 403. The instructions 407b may be executed by the processor 403 to implement the methods described above.

The UE 402 may also include a housing that contains one or more transmitters 458 and one or more receivers 420 to allow transmission and reception of data. The transmitter(s) 458 and receiver(s) 420 may be combined into one or more transceivers 418. One or more antennas 422a-n are attached to the housing and electrically coupled to the transceiver 418.

The various components of the UE 402 are coupled together by a bus system 411, which may include a power bus, a control signal bus, and a status signal bus, in addition to a data bus. However, for the sake of clarity, the various buses are illustrated in FIG. 4 as the bus system 411. The UE 402 may also include a digital signal processor (DSP) 413 for use in processing signals. The UE 402 may also include a communications interface 415 that provides user access to the functions of the UE 402. The UE 402 illustrated in FIG. 4 is a functional block diagram rather than a listing of specific components.

Figure 5:
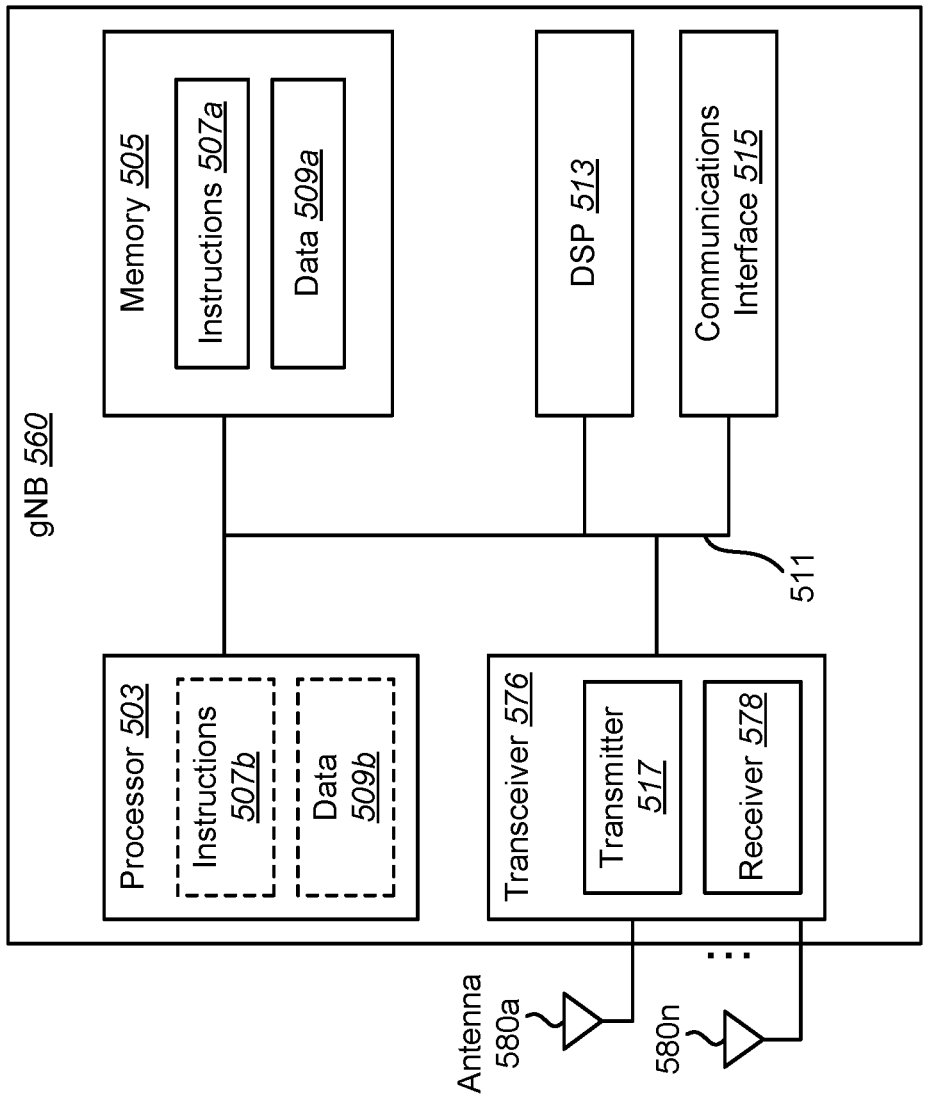
FIG. 5 illustrates various components that may be utilized in a gNB.

FIG. 5 illustrates various components that may be utilized in a gNB 560. The gNB 560 described in connection with FIG. 5 may be implemented in accordance with the gNB 160 described in connection with FIG. 1. In some examples, the gNB 560 may perform one or more of the methods, functions, operations, and/or examples, etc., described herein. The gNB 560 includes a processor 503 that controls operation of the gNB 560. The processor 503 may also be referred to as a central processing unit (CPU). Memory 505, which may include read-only memory (ROM), random access memory (RAM), a combination of the two or any type of device that may store information, provides instructions 507a and data 509a to the processor 503. A portion of the memory 505 may also include non-volatile random-access memory (NVRAM). Instructions 507b and data 509b may also reside in the processor 503. Instructions 507b and/or data 509b loaded into the processor 503 may also include instructions 507a and/or data 509a from memory 505 that were loaded for execution or processing by the processor 503. The instructions 507b may be executed by the processor 503 to implement the methods described above.

The gNB 560 may also include a housing that contains one or more transmitters 517 and one or more receivers 578 to allow transmission and reception of data. The transmitter(s) 517 and receiver(s) 578 may be combined into one or more transceivers 576. One or more antennas 580a-n are attached to the housing and electrically coupled to the transceiver 576.

The various components of the gNB 560 are coupled together by a bus system 511, which may include a power bus, a control signal bus, and a status signal bus, in addition to a data bus. However, for the sake of clarity, the various buses are illustrated in FIG. 5 as the bus system 511. The gNB 560 may also include a digital signal processor (DSP) 513 for use in processing signals. The gNB 560 may also include a communications interface 515 that provides user access to the functions of the gNB 560. The gNB 560 illustrated in FIG. 5 is a functional block diagram rather than a listing of specific components.

Figure 6:
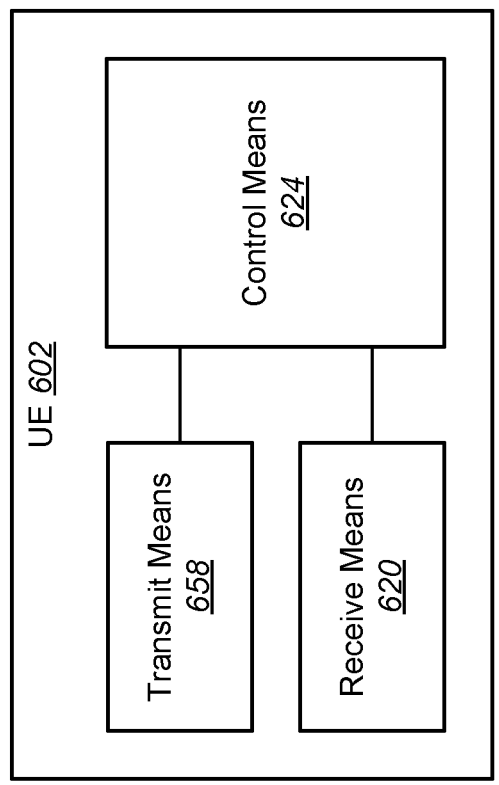
FIG. 6 is a block diagram illustrating one implementation of a UE in which the systems and methods described herein may be implemented.

FIG. 6 is a block diagram illustrating one implementation of a UE 602 in which the systems and methods described herein may be implemented. The UE 602 includes transmit means 658, receive means 620 and control means 624. The transmit means 658, receive means 620 and control means 624 may be configured to perform one or more of the functions described in connection with FIG. 1 above. FIG. 4 above illustrates one example of a concrete apparatus structure of FIG. 6. Other various structures may be implemented to realize one or more of the functions of FIG. 1. For example, a DSP may be realized by software.

Figure 7:
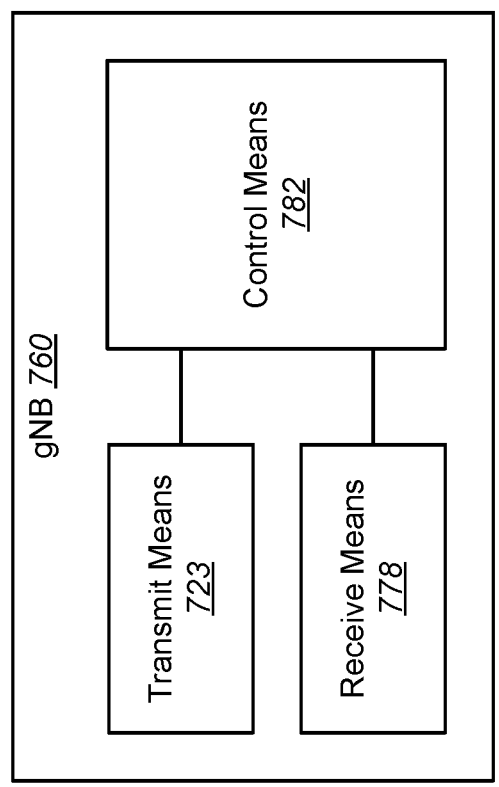
FIG. 7 is a block diagram illustrating one implementation of a gNB in which the systems and methods described herein may be implemented.

FIG. 7 is a block diagram illustrating one implementation of a gNB 760 in which the systems and methods described herein may be implemented. The gNB 760 includes transmit means 723, receive means 778 and control means 782. The transmit means 723, receive means 778 and control means 782 may be configured to perform one or more of the functions described in connection with FIG. 1 above. FIG. 5 above illustrates one example of a concrete apparatus structure of FIG. 7. Other various structures may be implemented to realize one or more of the functions of FIG. 1. For example, a DSP may be realized by software.

In the following, the description focuses on the case of overlapping between multiple HP PUCCHs for HP HARQ-ACK and or HP SR with a LP PUCCH. This may be a more common use case since the HP PUCCH may be configured with a subslot structure, and HP and LP traffics are scheduled separately.

A high priority UCI may be a high priority HARQ-ACK or a high priority SR. A high priority HARQ-ACK is corresponding to a high priority PDSCH transmission. A PDSCH may be dynamically scheduled by DCI, or configured by SPS. The priority of a scheduled PDSCH transmission may be determined by the priority indication in the scheduling DCI. The priority of a SPS PDSCH transmission may be configured by higher layer signaling. A high priority PUCCH resource should be used to report high priority HARQ-ACK with or without SR. A high priority PDSCH, high priority HARQ-ACK or high priority PUCCH resource may be configured to support URLLC services. The high priority is configured with a priority index 1. Thus, a high priority PDSCH/PUSCH is a PDSCH/PUSCH with priority index 1, a high priority HARQ-ACK is a HARQ-ACK with priority index 1 corresponding to a PDSCH with priority index 1. And a PUCCH resource with priority index 1 is used to report UCI with priority index 1.

A low priority UCI may be a low priority HARQ-ACK or a low priority SR, or a CSI report, etc. A low priority HARQ-ACK is corresponding to a low priority PDSCH transmission. The priority of a scheduled PDSCH transmission may be determined by the priority indication in the scheduling DCI. The priority of a SPS PDSCH transmission may be configured by higher layer signaling. A low priority PUCCH resource should be used to report low priority UCI. A low priority PDSCH, low priority HARQ-ACK or low priority PUCCH resource may be configured to support eMBB services. The low priority is configured with a priority index 0. Thus, a low priority PDSCH/PUSCH is a PDSCH/PUSCH with priority index 0, a low priority HARQ-ACK is a HARQ-ACK with priority index 0 corresponding to a PDSCH with priority index 0. And a PUCCH resource with priority index 0 is used to report UCI with priority index 0.

For HARQ-ACK priorities, if a UE is provided pdsch-HARQ-ACK-Codebook-List, the UE can be indicated by pdsch-HARQ-ACK-Codebook-List to generate one or two HARQ-ACK codebooks. If the UE is indicated to generate two HARQ-ACK codebooks, a first HARQ-ACK codebook is associated with a PUCCH of priority index 0 and a second HARQ-ACK codebook is associated with a PUCCH of priority index 1

For SR priorities, a UE can be configured by SchedulingRequestResourceConfig a set of configurations for SR in a PUCCH transmission using either PUCCH format 0 or PUCCH format 1. A UE may be configured by schedulingRequestIDForBFR, a configuration for link recovery request (LRR) in a PUCCH transmission using either PUCCH format 0 or PUCCH format 1. The UE may be configured, by schedulingRequestPriority in SchedulingRequestResourceConfig, a priority index 0 or a priority index 1 for the SR.

A PUSCH or a PUCCH, including repetitions if any, can be of priority index 0 or of priority index 1. If a priority index is not provided for a PUSCH or a PUCCH, the priority index is 0. If in an active DL BWP a UE monitors PDCCH either for detection of DCI format 0_1 and DCI format 1_1 or for detection of DCI format 0_2 and DCI format 1_2, a priority index can be provided by a priority indicator field. If a UE indicates a capability to monitor, in an active DL BWP, PDCCH for detection of DCI format 0_1 and DCI format 1_1 and for detection of DCI format 0_2 and DCI format 1_2, a DCI format 0_1 or a DCI format 0_2 can schedule a PUSCH transmission of any priority and a DCI format 1_1 or a DCI format 1_2 can schedule a PDSCH reception and trigger a PUCCH transmission with corresponding HARQ-ACK information of any priority. If, after resolving overlapping for PUCCH and/or PUSCH transmissions of a same priority index, a UE determines to transmit a first PUCCH of larger priority index, a PUSCH or a second PUCCH of smaller priority index, and a transmission of the first PUCCH would overlap in time with a transmission of the PUSCH or the second PUCCH, the UE does not transmit the PUSCH or the second PUCCH a PUSCH of larger priority index, a PUCCH of smaller priority index, and a transmission of the PUSCH would overlap in time with a transmission of the PUCCH, the UE does not transmit the PUCCH a first PUSCH of larger priority index on a serving cell, a second PUSCH of smaller priority index on the serving cell, and a transmission of the first PUSCH would overlap in time with a transmission of the second PUSCH, the UE does not transmit the second PUSCH, where at least one of the two PUSCH is not scheduled by a DCI format In NR Rel-16, a UE may only multiplex UCIs with same priority index in a PUCCH or a PUSCH. A PUCCH or a PUSCH is assumed to have a same priority index as a priority index of UCIs a UE multiplexes in the PUCCH or the PUSCH. For intra-UE collision between uplink channels with different priorities, the uplink channel with high priority is transmitted, and the low priority channel is dropped.

If a UE is provided two PUCCH-Config if the UE is provided subslotLengthForPUCCH-r16 in the first PUCCH-Config, the PUCCH resource for any SR configuration with priority index 0 or any CSI report configuration in any PUCCH-Config is within the subslotLengthForPUCCH-r16 symbols in the first PUCCH-Config if the UE is provided subslotLengthForPUCCH-r16 in the second PUCCH-Config, the PUCCH resource for any SR configuration with priority index 1 in any PUCCH-Config is within the subslotLengthForPUCCH-r16 symbols in the second PUCCH-Config In the below, if a UE is not provided subslotLength-ForPUCCH, a slot for an associated PUCCH transmission includes all symbols in a slot, 14 symbols with normal cyclic prefix or 12 symbols with extended cyclic prefix. And if a UE is provided subslotLength-ForPUCCH, a slot for an associated PUCCH transmission includes a number of symbols indicated by subslotLength-ForPUCCH.

Each SR configuration may correspond to one or more logical channels and/or to SCell beam failure recovery and/or to consistent LBT failure recovery. Each logical channel, SCell beam failure recovery, and/or consistent LBT failure recovery may be mapped to zero or one SR configuration, which is configured by RRC. The SR configuration of the logical channel that triggered a buffer status report (BSR) or the SCell beam failure recovery or the consistent LBT failure recovery (if such a configuration exists) is considered as corresponding SR configuration for the triggered SR. Any SR configuration may be used for an SR triggered by Pre-emptive BSR.

A UE 102 may be configured, by SchedulingRequestResourceConfig, a set of configurations for SR in a PUCCH transmission using either PUCCH format 0 or PUCCH format 1. A UE 102 may be configured, by schedulingRequestID-BFR-SCell-r16, a configuration for LRR in a PUCCH transmission using either PUCCH format 0 or PUCCH format 1. The UE 102 may be provided, by phy-PriorityIndex-r16 in SchedulingRequestResourceConfig, a priority index 0 or a priority index 1 for the SR. If the UE 102 is not provided a priority index for SR, the priority index may be 0.

The UE 102 may transmit a PUCCH in the PUCCH resource for the corresponding SR configuration only when the UE 102 transmits a positive SR. For a positive SR transmission using PUCCH format 0, the UE 102 may transmit the PUCCH by obtaining initial cycle shift $m_0$ as described for HARQ-ACK information and by setting an additional cycle shift $m_{cs}=0$. For a positive SR transmission using PUCCH format 1, the UE 102 may transmit the PUCCH by setting the information bit b(0)=0. If the PUCCH for a positive SR does not overlap with another PUCCH or PUSCH, the PUCCH for the positive SR may be transmitted at the configured PUCCH resource.

UCI Multiplexing on PUCCH with Different Priorities

In NR, up to 8 SR can be configured. In NR Rel-16, joint HARQ-ACK and SR reporting is supported only for the same priority. For low priority HARQ-ACK codebook, HARQ-ACK codebook with priority index 0, the PUCCH resources may be configured at slot level or subslot level. However, only one PUCCH carrying low priority HARQ-ACK can be reported in a slot. For PUCCH carrying high priority HARQ-ACK, more than 2 PUCCH transmissions may be supported in a slot.

In Rel-16, the channel dropping rule is defined so that the high priority channel is transmitted, and the low priority channel is dropped in case of channel overlapping. And dropping timelines are defined for different types of UL channels and UCI types.

In Rel-17, for UCI multiplexing on PUCCH with different priorities, two methods may be supported for enabling and disabling signaling.

In one method, enabling/disabling is configured by higher layer signaling, i.e. RRC signaling. In this case, the multiplexing timeline is assumed to be satisfied if overlapping occurs.

In another method, enabling/disabling can be dynamically indicated by DCI. If indicated by DCI, the UE does not need to check the timeline, and should assume the UCI multiplexing timeline is satisfied.

In general, for a high priority UCI (e.g. HARQ-ACK or SR) multiplexing with low priority UCI on a single PUCCH, the low priority PUCCH should satisfy the dropping timeline in Rel-16, so that the low priority PUCCH can be fully dropped. Otherwise, if the low priority PUCCH transmission is already started, the existing channel dropping method should be used, so that the high priority PUCCH is transmitted and the low priority PUCCH is dropped. Furthermore, extra processing time may be added to the dropping timeline to perform multiplexing of UCIs with different priorities. The extra processing time may be defined by a number of symbols, e.g. 1, 2, 3 symbols depending on UE capabilities. The extra processing time may be determined by the type of UCIs with different priorities, e.g. multiplexing HARQ-ACK with different priorities may require a longer multiplexing processing time than a HARQ-ACK with SR with different priorities. If the multiplexing timeline requirement is satisfied, multiplexing of UCI with different priorities on a single uplink channel can be performed if configured and enabled.

The dynamic enabling and disabling methods are applied mainly for multiplexing of HP HARQ-ACK and/or HP SR with LP HARQ-ACK. The LP SR may not be multiplexed with HP UCI, e.g. HP HARQ-ACK and/or HP SR.

Furthermore, for handling overlapping PUCCHs/PUSCHs with different priorities, the UE first resolves channels with the same priority in Step 1, then resolves channels with different priorities in Step 2.

Additionally, Step 2 includes the following sub-steps, Step 2.1: Resolve collision of LP PUCCHs and HP PUCCHs; and Step 2.2: Resolve collision of PUCCHs and PUSCHs of different priorities.

Moreover, different UE capabilities for evaluating the multiplexing timing may be applied in Step 2. If multiplexing of PUCCHs and/or PUSCHs with different priorities is enabled by RRC, support both of the following UE capabilities to resolve collision of PUCCHs and/or PUSCHs with different priorities in Step 2:

Capability #1: It is not expected that Rel-15 multiplexing timeline is not met for all overlapping channels [FFS the overlapping channels are resultant channels after step 1]. UE performs multiplexing or dropping of PUCCHs and/or PUSCHs with different priorities according to Rel-17 rules.

Dynamic enabling/disabling multiplexing for different priorities is not supported for Capability #1

Capability #3: Rel-17 multiplexing for different priorities is dynamically enabled/disabled in Step 2.

Dynamic indication of enabling/disabling multiplexing for different priorities can be enabled only if multiplexing of PUCCHs/PUSCHs with different priorities is enabled by RRC configuration.

If dynamic multiplexing for different priorities is indicated as enabled for a PUCCH/PUSCH, the UE performs Rel-17 multiplexing operation using the Rel-15 timeline The gNB is responsible to ensure that all the DCIs associated with all overlapping channels involved in multiplexing in step 2 meet the Rel-15 timeline for multiplexing.

If dynamic multiplexing for different priorities is indicated as disabled for a PUCCH/PUSCH, the UE does not apply the Rel-17 intra-UE multiplexing If the UL channel associated with the DCI disabling multiplexing collides with another UL channel of a different priority, UE performs R16 PHY prioritization, using Rel-16 timeline. The gNB is responsible to ensure that the UE meets R16 PHY prioritization timeline.

If the UL channel associated with the DCI disabling multiplexing does not collide with another UL channel of a different priority, UE transmits the UL channel as is.

FFS: whether the UL channel associated with the DCI disabling multiplexing can collide with another UL channel of a same priority.

UE does not expect to receive a dynamic indication resulting in demultiplexing of previously multiplexed PUCCHs/PUSCHs channels after the Rel-15 multiplexing deadline has passed FFS: UE does not expect to receive a dynamic indication resulting in demultiplexing of previously multiplexed PUCCHs/PUSCHs channels without any associated DCIs Note: demultiplexing of two previously multiplexed channels means decoupling two channels already multiplexed, dropping one channel, and multiplexing the other channel with another channel(s).

The above behaviors of Capability #3 at least apply to resolving collision of two UL channels resulting from Step 1 with different priorities. FFS: more than two UL channels.

FFS whether dynamic indication in multiple DCIs associated with a group of overlapping channels have to be consistent FFS: Configuration of prioritization/multiplexing of channels without dynamic indication Note: Capability 3 procedure is a super-set of Capability 1 procedure FFS: Time unit to apply Rel-15 timeline (e.g. slot based, sub-slot based)

FFS: The set of PUSCH and PUCCH that eligible for Rel-15 multiplexing consideration Note: "collision" refers to overlapping PUCCHs, overlapping PUCCH and PUSCH (excluding PUSCH supporting simultaneous transmission with PUCCH), overlapping PUSCHs on a same cell.

Note: "Rel-15 multiplexing timeline" means Rel15 timeline calculation in Rel-16 spec, including all the formula and all the values for the variables Note: "Rel-16 prioritization timeline" means Rel-16 cancellation timeline calculation in Rel-16 spec, including all the formula and all the values for the variables In NR Rel-17, UCI multiplexing between different priorities will be supported if it is configured or indicated. For UCI multiplexing on PUCCH, at least the following scenarios will be supported.

Case 1: Multiplexing a high-priority HARQ-ACK and a low-priority HARQ-ACK into a PUCCH If a HP PUCCH with HP HARQ-ACK overlaps with a LP PUCCH with LP HARQ-ACK, the HP HARQ-ACK and LP HARQ-ACK can be multiplexed on a HP PUCCH resource determined based on the total payload of the HP HARQ-ACK and the LP HARQ-ACK.

Case 2: Multiplexing a low-priority HARQ-ACK and a high-priority SR into a PUCCH for some HARQ-ACK/SR PUCCH format combinations.

If a HP PUCCH with HP SR overlaps with a LP PUCCH with LP HARQ-ACK, a positive HP SR and LP HARQ-ACK may be reported on a single PUCCH. The detailed methods are not agreed yet.

Case 3: Multiplexing a low-priority HARQ-ACK, a high-priority HARQ-ACK and a high-priority SR into a PUCCH.

In Step 1, UE performs collision resolution between channels with the same priority first. Thus, if a PUCCH with HP HARQ-ACK overlaps with a PUCCH with HP positive SR, the HP HARQ-ACK and the HP SR should be multiplexed first, then if the resulting HP PUCCH overlaps with a LP PUCCH with LP HARQ-ACK, the HP HARQ-ACK and HP SR can be multiplexed with the LP HARQ-ACK on a HP PUCCH resource.

Note that in case of overlapping between a HP PUCCH with HP HARQ-ACK and a LP PUCCH with CSI or a LP PUCCH with positive LP SR, the CSI or LP SR will be dropped. Therefore, the CSI or a LP SR cannot be multiplxed with HP HARQ-ACK or HP SR.

However, there are some cases that may occur between PUCCHs with different priorities, and should be further specified, including the following cases:

Case 4: If there is a LP PUCCH with LP HARQ-ACK overlaps with more than one HP PUCCHs with HP HARQ-ACK.

Case 5: If there is a LP PUCCH with LP HARQ-ACK overlaps with a HP PUCCH with HP HARQ-ACK and a HP PUCCH with a positive HP SR, and the HP PUCCH with HP HARQ-ACK does not overlap with the HP PUCCH with a positive HP SR.

Case 5 is different from Case 3. In Case 3, the HP PUCCH for HP HARQ-ACK overlaps with the HP PUCCH for a HP SR. So the HP HARQ-ACK and HP SR are multiplexed first in Step 2, and there is only one HP PUCCH with HP HARQ-ACK and HP SR overlaps with the LP PUCCH with LP HARQ-ACK.

This present techniques propose enhancements for overlapping between multiple HP PUCCHs with LP PUCCH in Step 2.1, especially for Case 4 and Case 5 above. Depending on the UCI types carried on the PUCCHs, different methods may be introduced for UCI multiplexing on PUCCH and channel dropping. In this disclosure, we assume the HARQ-ACK multiplexing timeline can be satisfied regardless of enabling and disabling methods.

Potential Problems with Multiple HP PUCCH Overlapping with a LP PUCCH

If a UE is provided two PUCCH-Config, HP PUCCH resources, i.e. PUCCH resources with priority 1 is configured to report the HP HARQ-ACK, i.e. HARQ-ACK with priority index 1. LP PUCCH resources, i.e. PUCCH resources with priority 0 is configured to report the LP HARQ-ACK, i.e. HARQ-ACK with priority index 0.

The PUCCH resources may be configured with slot or subslot.

For example, the HP PUCCH resources are configured with subslot, and the LP PUCCH resources are configured with slot. The subslot duration may be 2 or 7 symbols.

In another example, the HP PUCCH resources are configured with subslot, and the LP PUCCH is configured with subslot. In this case, the subslot duration configured for the HP PUCCH should be shorter than or the same as the sublot duration for the LP PUCCH.

If the HP PUCCH is configured with subslot, HP HARQ-ACK may be reported in each subslot. Thus, it is very likely that a LP PUCCH may overlap with multiple HP PUCCH carrying HP HARQ-ACK and or HP SR.

The multiple HP PUCCHs overlap with a LP PUCCH may happen in many different scenarios, e.g.

A HP PUCCH may be scheduled by one or more DCI with the HARQ-ACK timing indication.

A HP PUCCH may be configured for SPS transmission with high priority

A HP PUCCH may be a deferred retransmission of an earlier HP PUCCH for SPS that conflicts with a SFI configuration.

A HP PUCCH may be triggered by a positive SR on a configured HP SR PUCCH resource.

Figure 8:
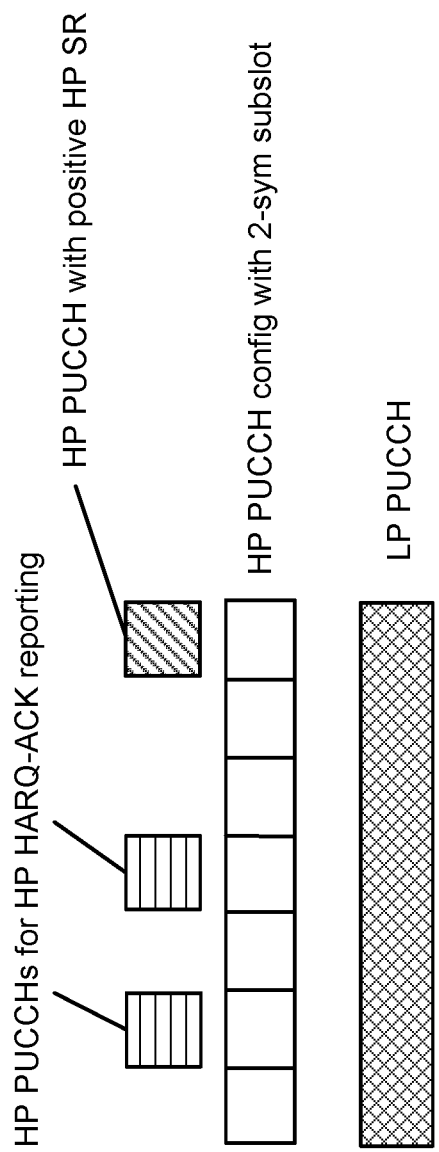
FIG. 8 is a diagram illustrating multiple HP PUCCHs for HP HARQ-ACK and/or HP SR overlap with a LP PUCCH.

FIG. 8 is a diagram illustrating multiple HP PUCCHs for HP HARQ-ACK and/or HP SR overlap with a LP PUCCH. As an example, shown in FIG. 8, the HP PUCCH is configured with a subslot duration of 2 symbols, there is potential 7 PUCCH transmissions for HARQ-ACK reporting in a slot.

In the example, there are two HP HARQ-ACK reporting on HP PUCCH corresponding to HP PDSCH transmissions.

All HP PUCCHs overlap with a LP PUCCH which occupies all symbols in the slot. Similarly, one or more of the HP PUCCH may be triggered by positive SR on the configured HP SR PUCCH resources.

Collision Handling Between Multiple High Priority PUCCHs with HARQ-ACK and a Low Priority PUCCH with HARQ-ACK This section provides detailed methods for multiplexing of HARQ-ACK with different priorities in case 4 if a LP PUCCH with LP HARQ-ACK overlaps with more than one HP PUCCHs with HP HARQ-ACK.

Currently, only one HARQ-ACK codebook of each priority is considered for multiplexing on a PUCCH. If there are multiple HP PUCCHs carrying HP HARQ-ACKs overlap with a PUCCH, the UE should determine which HP HARQ-ACK from the overlapping HP PUCCHs is used to multiplex with the LP HARQ-ACK.

If only RRC configuration is used for enabling and disabling of UCI multiplexing with different priorities. In one method, the LP HARQ-ACK is allowed to multiplex with the HP HARQ-ACK of the first overlapping HP PUCCH only. In case of the multiplexing timeline requirements cannot be satisfied with the earliest HP PUCCH, the LP PUCCH with LP HARQ-ACK is cancelled, and the HP PUCCH is transmitted. If the LP PUCCH with HARQ-ACK is cancelled by an earlier HP PUCCH, the LP HARQ-ACK is not considered again for multiplexing with UCIs on later HP PUCCHs.

If UCI multiplexing with different priorities on PUCCH is enabled by RRC configuration, and explicit dynamic DCI indication is also supported, several methods can be considered to determine the corresponding HP PUCCH and the HP HARQ-ACK used to multiplex the LP HARQ-ACK.

Method 1: Dynamic DCI Indication is Allowed in the Scheduling DCI of the Last HP PDSCH of the Earliest Overlapping HP PUCCH for HP HARQ-ACK Only.

Figure 9:
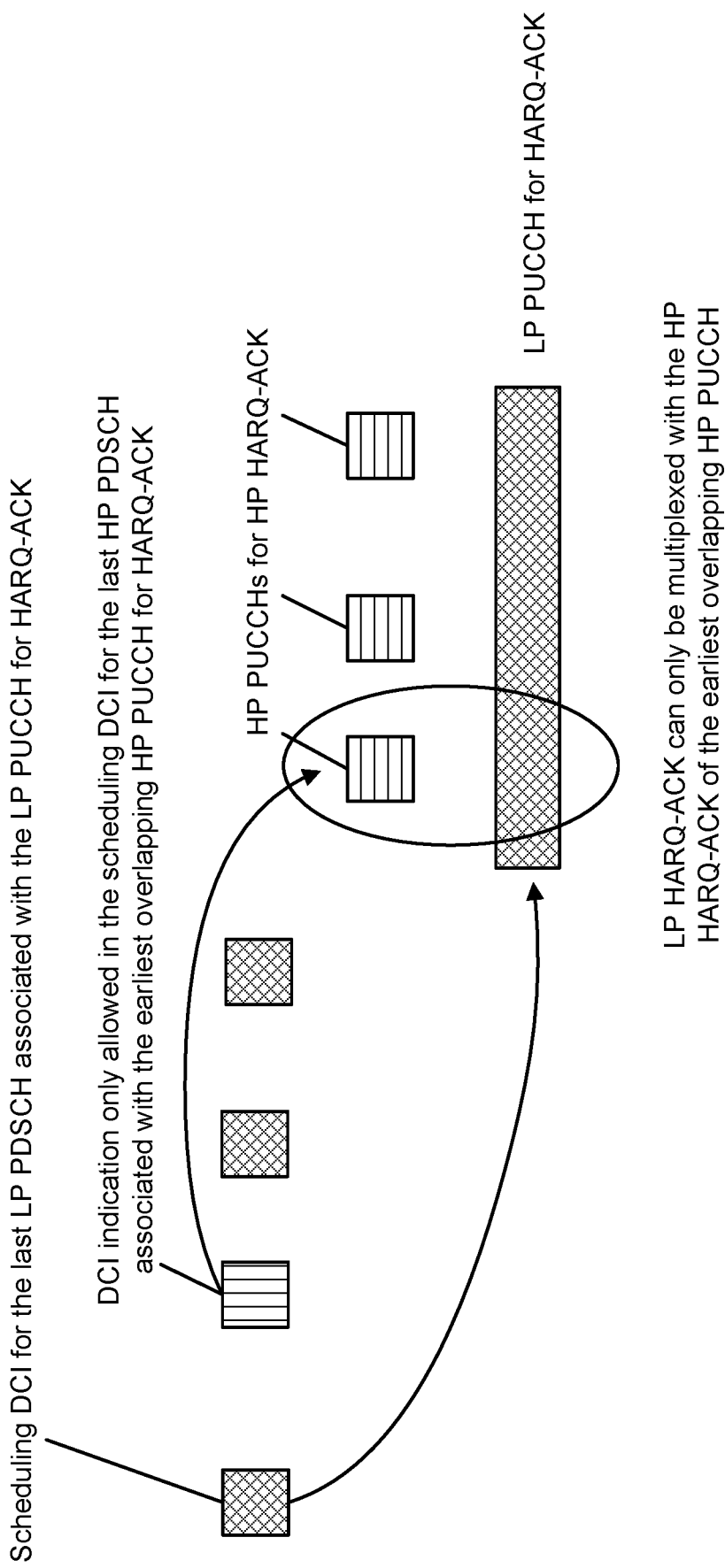
FIG. 9 is a diagram illustrating dynamic DCI indication.

FIG. 9 is a diagram illustrating dynamic DCI indication being allowed only in the scheduling DCI of the last HP PDSCH associated with the earliest overlapping HP PUCCH for HARQ-ACK.

As shown in FIG. 9:
If the dynamic DCI enables the UCI multiplexing with different priorities in the scheduling DCI of the last HP PDSCH corresponding to the HP HARQ-ACK in the earliest overlapping HP PUCCH, the LP HARQ-ACK is multiplexed with the HP HARQ-ACK in the first overlapping HP PUCCH on a HP PUCCH resource in the same subslot of the earliest overlapping HP PUCCH with HP HARQ-ACK.

If the dynamic DCI disables the UCI multiplexing with different priorities in the scheduling DCI of the last HP PDSCH corresponding to the HP HARQ-ACK in the earliest overlapping HP PUCCH, the LP PUCCH with LP HARQ-ACK is cancelled and not considered for multiplexing with HP HARQ-ACK of later overlapping HP PUCCH. Thus, the HP PUCCH with HP HARQ-ACK and later overlapping HP PUCCHs are transmitted.

This method provides simple and consistent results as in RRC configuration only case. However if the LP HARQ-ACK is multiplexed with the earliest overlapping HP HARQ-ACK duo to timeline constraint or DCI indication, the LP HARQ-ACK will be reported as scheduled. However, the LP HARQ-ACK should be stored in case of an enhanced HARQ-ACK retransmission is triggered in a later slot by a DCI for the dropped HARQ-ACK retransmission or in an enhanced Type-3 codebook reporting.

Method 2: Dynamic DCI Indication is Allowed in the Scheduling DCI of the Last HP PDSCH of any One of the Overlapping HP PUCCH for HP HARQ-ACK.

Figure 10:
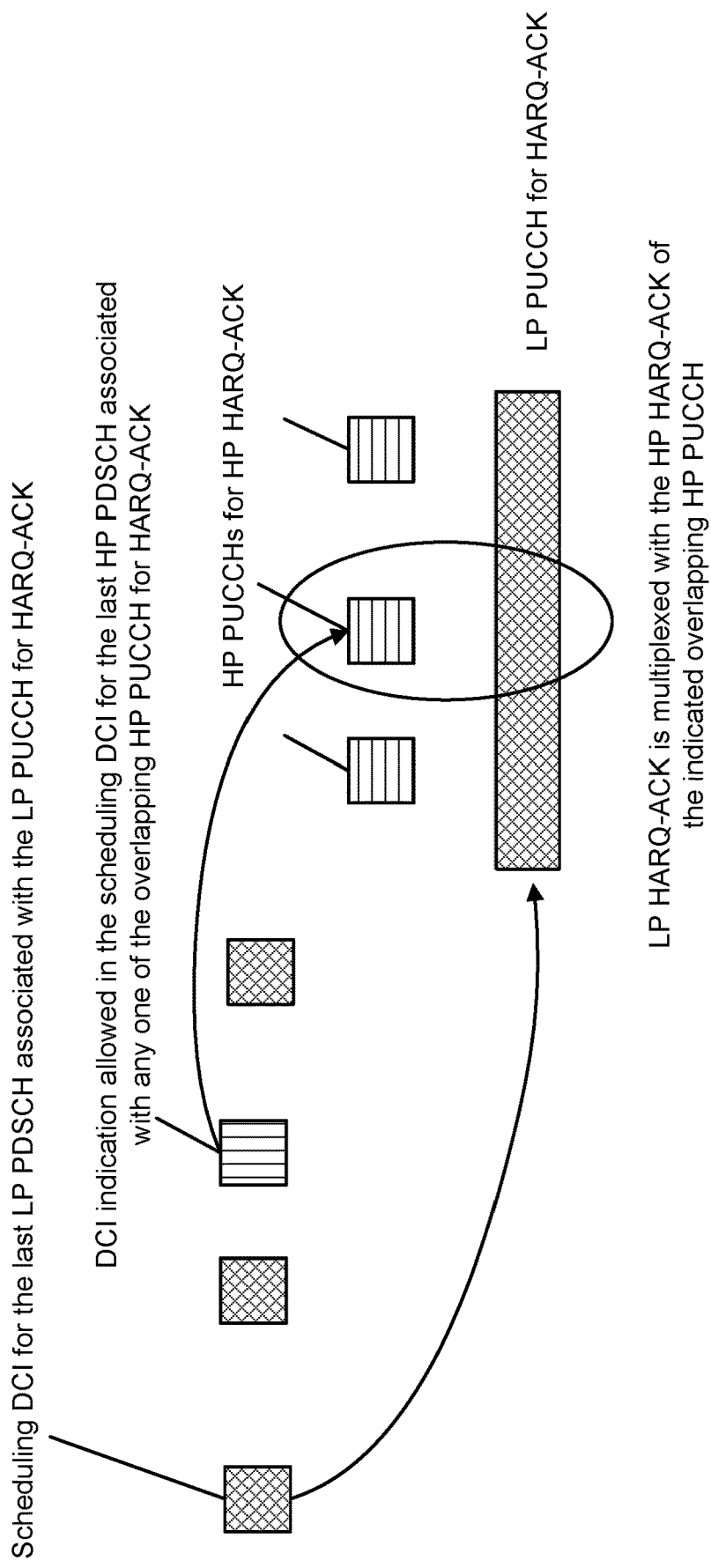
FIG. 10 is a diagram illustrating dynamic DCI indication.

FIG. 10 is a diagram illustrating dynamic DCI indication being allowed in the scheduling DCI of a last HP PDSCH associated with any one of the overlapping HP PUCCHs for HARQ-ACK.

As shown in FIG. 10:
If the dynamic DCI disables the UCI multiplexing with different priorities in the scheduling DCI of the last HP PDSCH of all overlapping HP PUCCH for HP HARQ-ACK, the LP PUCCH with LP HARQ-ACK is cancelled. Thus, the HP PUCCH with HP HARQ-ACK and later overlapping HP PUCCHs are transmitted.

If the dynamic DCI enables the UCI multiplexing with different priorities in the scheduling DCI of the last HP PDSCH of an overlapping HP PUCCH for HP HARQ-ACK, the LP HARQ-ACK is multiplexed with the HP HARQ-ACK of the corresponding overlapping HP PUCCH on a HP PUCCH resource in the same subslot of the corresponding overlapping HP PUCCH with HP HARQ-ACK.

The dynamic enabling indication is allowed only in the scheduling DCI of the last HP PDSCH of one of overlapping HP PUCCHs for HP HARQ reporting.

The dynamic enabling indication is allowed only in the scheduling DCI of the last HP PDSCH of any overlapping HP PUCCHs for HP HARQ reporting.

Since the LP PUCCH with LP HARQ-ACK is cancelled regardless the LP HARQ-ACK is multiplexed with a HP HARQ-ACK or not, Method 2 provides more choices for the LP HARQ-ACK reporting with a HP HARQ-ACK. Thus, even if the LP HARQ-ACK is multiplexed with HP HARQ-ACK or an earlier overlapping HP PUCCH, the LP HARQ-ACK should be stored for potential multiplexing with a HP HARQ-ACK until an enabling indication is received or the end of the LP PUCCH.

Furthermore, the LP HARQ-ACK should be stored in case of an enhanced HARQ-ACK retransmission is triggered in a later slot by a DCI for the dropped HARQ-ACK retransmission or in an enhanced Type-3 codebook reporting.

Since dynamic DCI indication is more flexible, Method 2 is preferable in several cases, e.g.
If there is not enough time for the UE to perform HARQ-ACK multiplexing with the HP HARQ-ACK in the first overlapping HP PUCCH; or
If the HP HARQ-ACK payload is much smaller in a later overlapping HP PUCCH.

Method 3: The Dynamic DCI Indications are Included in the Scheduling DCI for the Last LP PDSCH Corresponding to the LP HARQ-ACK in the LP PUCCH, and in the Scheduling DCI of the Last HP PDSCH Corresponding to the HP HARQ-ACK in an Overlapping HP PUCCH.

Figure 11:
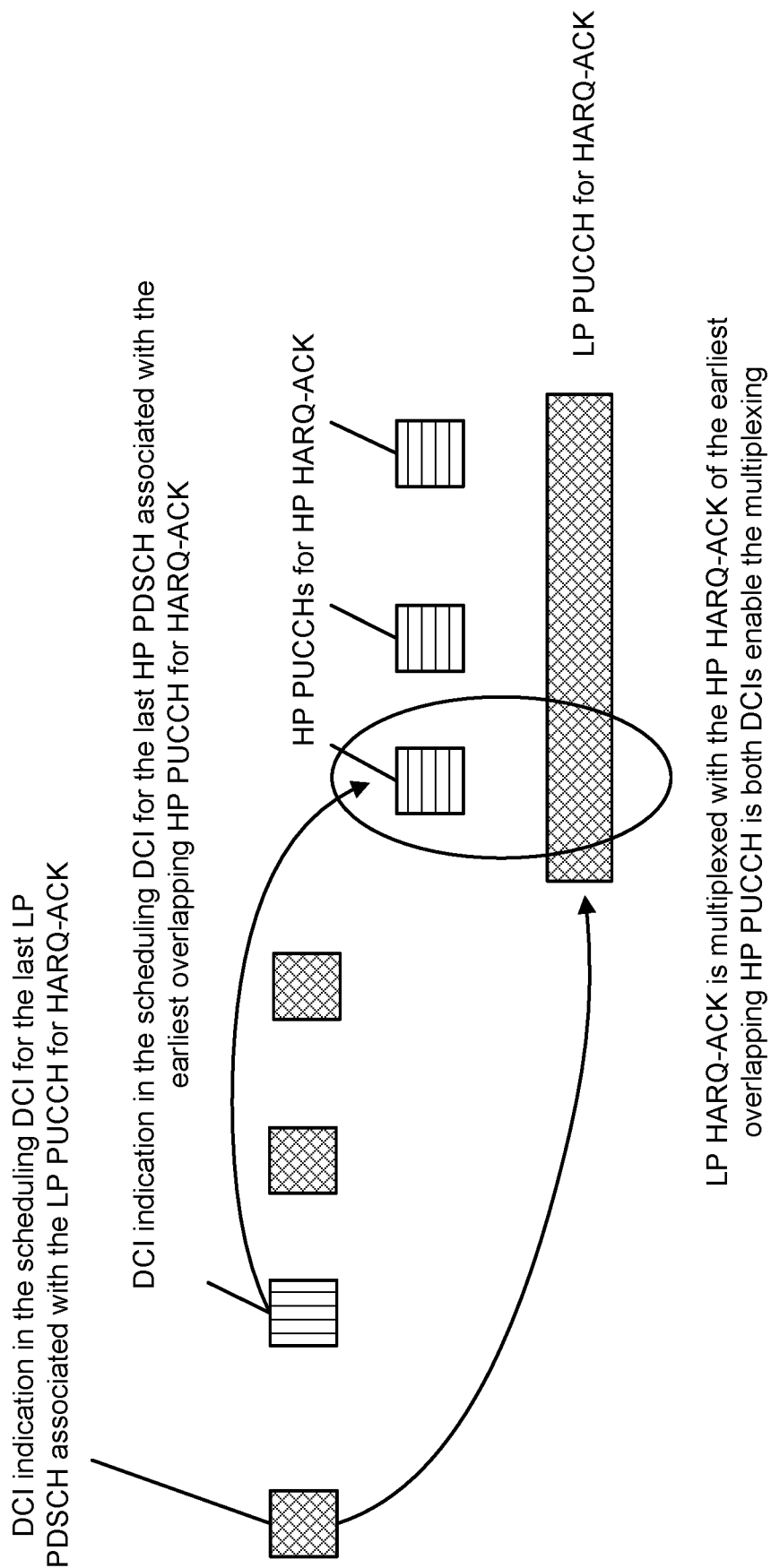
FIG. 11 is a diagram illustrating dynamic DCI indication.

FIG. 11 is a diagram illustrating dynamic DCI indications in the scheduling DCI of the last HP PDSCH and the last LP PDSCH associated with the corresponding HP PUCCH for HARQ-ACK and LP PUCCH for HARQ-ACK.

In previous Methods, the dynamic indication of enabling/disabling UCI multiplexing with different priorities is included only in scheduling DCI of the HP PDSCH. In Method 3, the dynamic indication of enabling/disabling UCI multiplexing with different priorities can be included in a scheduling DCI of a HP PDSCH as well as a scheduling DCI of a LP PDSCH.

With Method 3, the HP HARQ-ACK and LP HARQ-ACK multiplexing is allowed only if UCI multiplexing with different priorities in enabled in both the scheduling DCI for the last LP PDSCH corresponding to the LP HARQ-ACK in the LP PUCCH, and the scheduling DCI of the last HP PDSCH corresponding to the HP HARQ-ACK in an overlapping HP PUCCH, as shown in FIG. 11.

In one approach, the dynamic indication is allowed only in the scheduling DCI of the last HP PDSCH corresponding to the HP HARQ-ACK in the first overlapping HP PUCCH.

In another approach, the dynamic indication is allowed in the scheduling DCI of the last HP PDSCH corresponding to the HP HARQ-ACK in any one of overlapping HP PUCCHs.

The HP HARQ-ACK and LP HARQ-ACK multiplexing is not performed if UCI multiplexing with different priorities in disabled in the scheduling DCI for the last LP PDSCH corresponding to the LP HARQ-ACK in the LP PUCCH, or if UCI multiplexing with different priorities in disabled in the scheduling DCI of the last HP PDSCH corresponding to the HP HARQ-ACK in all overlapping HP PUCCHs.

Method 3 provides validation of DCI indications in at least two DCIs, thus reduces the probability of UCI multiplexing on PUCCH. Furthermore, since a positive HP SR is triggered at UE side, there is no DCI indication for multiplexing with HP SR with LP HARQ-ACK on PUCCH. The dynamic DCI indication in the scheduling DCI for the last LP PDSCH corresponding to the LP HARQ-ACK in the LP PUCCH provides a method to dynamically enable or disable HP SR multiplexing with LP HARQ-ACK.

Collision Handling Between Multiple High Priority PUCCHs with HARQ-ACK and SR and a Low Priority PUCCH with HARQ-ACK Herein are detailed methods for multiplexing of UCI with different priorities in case 5 if a LP PUCCH overlaps with HP PUCCH with HP HARQ-ACK and HP PUCCH with positive HP SR, where the HP PUCCH with HP HARQ-ACK does not overlap with HP PUCCH with positive HP SR. In case 5, there may be multiple HP PUCCHs with HP HARQ-ACKs overlap with the LP PUCCH as in case 4. The UE should determine only one HP PUCCH for HP HARQ-ACK first as in case 4, then consider the overlapping scenario in case 5.

The detailed methods and supported scenarios for positive HP SR multiplexing with LP HARQ-ACK on PUCCH are not agreed in 3GPP yet. The HP SR and LP HARQ-ACK multiplexing can be further divided into multiple subcases, e.g.

Case 1: Up to 2 bits of LP HARQ-ACK with PUCCH format 0/1. There are 4 possible combinations on PUCCH formats between the LP HARQ-ACK and the HP SR. If there is no positive HP SR, the LP HARQ-ACK is reported on the LP PUCCH. If there is a positive HP SR, it should be specified for each case on whether UCI multiplexing or channel dropping should be performed, and which PUCCH resource should be used if multiplexing is applied.

Subcase 1: positive HP SR with PUCCH format 1 and LP HARQ-ACK with PUCCH format 1. The LP HARQ-ACK can be reported on the HP PUCCH resource for the HP SR.

Subcase 2: positive HP SR with PUCCH format 1 and LP HARQ-ACK with PUCCH format 0. It is desirable to report the LP HARQ-ACK on the HP PUCCH resource for the HP SR as in Subcase 1. Although it is also possible to report the HP SR on the LP HARQ-ACK PUCCH using a cyclic shift value.

Subcase 3: positive HP SR with PUCCH format 0 and LP HARQ-ACK with PUCCH format 0. In one approach, the LP HARQ-ACK is represented by a cyclic shift value on the PUCCH for the positive HP SR. In another approach, the positive HP SR is reported on the LP HARQ-ACK PUCCH using a cyclic shift value.

Subcase 4: positive HP SR with PUCCH format 0 and LP HARQ-ACK with PUCCH format 1. In one approach, the LP HARQ-ACK is represented by a cyclic shift value on the PUCCH for the positive HP SR. In another approach, multiplexing is not supported for this case. Thus, the PUCCH with positive HP SR is transmitted and the LP PUCCH with LP HARQ-ACK is cancelled.

Case 2: More than 2 bits of LP HARQ-ACK with PUCCH format 2/3/4. Again, more discussion is needed on whether UCI multiplexing or channel dropping should be performed, and which PUCCH resource should be used if multiplexing is performed. Several potential approaches are given below as examples.

In one approach, the HP SR is appended or prepended to the LP HARQ-ACK bits and jointly reported on the LP PUCCH resource.

In another approach, the HP SR and the LP HARQ-ACK bits are reported on a newly selected HP PUCCH resource configured for HP HARQ-ACK.

Yet in another approach, multiplexing is not supported for this case. Thus, the PUCCH with positive HP SR is transmitted and the LP PUCCH with LP HARQ-ACK is cancelled.

Therefore, as shown above, for HP SR multiplexing with LP HARQ-ACK, not all scenarios may be supported. Also, the HP SR and LP HARQ-ACK may be multiplexed on a HP PUCCH resource or a LP PUCCH resource. Thus, the solutions to select the suitable PUCCH resource for UCI multiplexing with different priorities.

Solution 1: The LP HARQ-ACK is Multiplexed Only with HP HARQ-ACK

Figure 12:
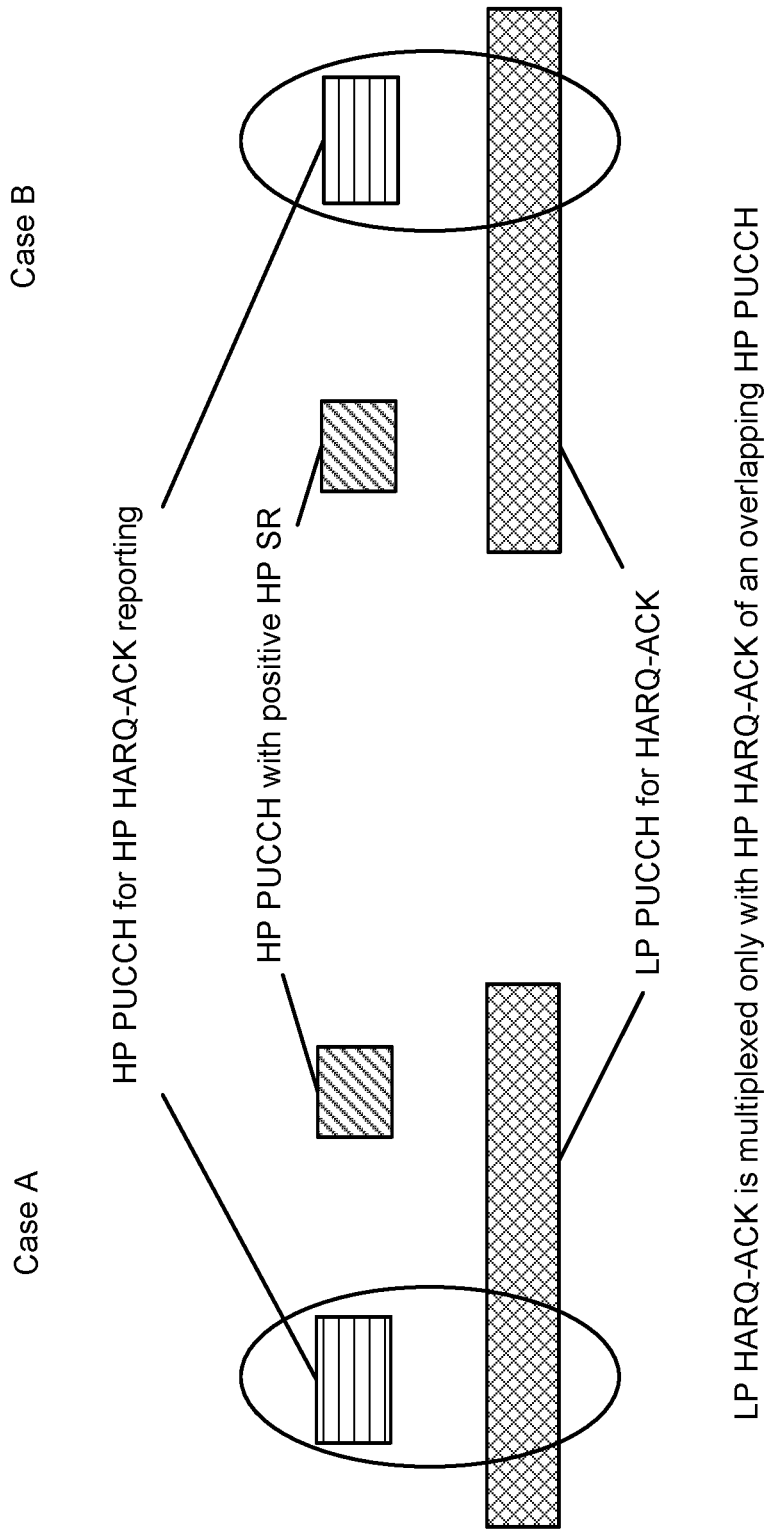
FIG. 12 is a diagram illustrating a LP HARQ-ACK being multiplexed with a HP HARQ-ACK.

FIG. 12 is a diagram illustrating a LP HARQ-ACK being multiplexed only with a HP HARQ-ACK.

If only RRC configuration is used for enabling and disabling of UCI multiplexing with different priorities, and if a LP PUCCH with LP HARQ-ACK overlaps with both HP PUCCH with HP HARQ-ACK and HP PUCCH with positive HP SR, the LP HARQ-ACK is multiplexed only with HP HARQ-ACK on a HP PUCCH resource. The PUCCH for positive HP SR is transmitted as it is.

If UCI multiplexing with different priorities on PUCCH is enabled by RRC configuration, and explicit dynamic DCI indication is also supported, the Methods 1-3 above can be used to determine whether LP HARQ-ACK multiplexing with HP HARQ-ACK is performed, and which HP HARQ-ACK should be used for the multiplexing in case of more than one overlapping HP PUCCHs with HP HARQ-ACK. If the UCI multiplexing with different priorities are disabled by DCI indication, the LP PUCCH with LP HARQ-ACK is cancelled, and the HP PUCCH with HARQ-ACK and the HP PUCCH with positive HP SR are transmitted.

Again, the LP HARQ-ACK should be stored in case of an enhanced HARQ-ACK retransmission is triggered in a later slot by a DCI for the dropped HARQ-ACK retransmission or in an enhanced Type-3 codebook reporting.

Solution 2: Based on Timeline, LP HARQ-ACK is Multiplexed with the UCI of the Earliest Overlapping HP PUCCH FIG. 13 is a diagram illustrating a LP HARQ-ACK being multiplexed with the HP UCI from the earliest overlapping HP PUCCH.

Figure 13:
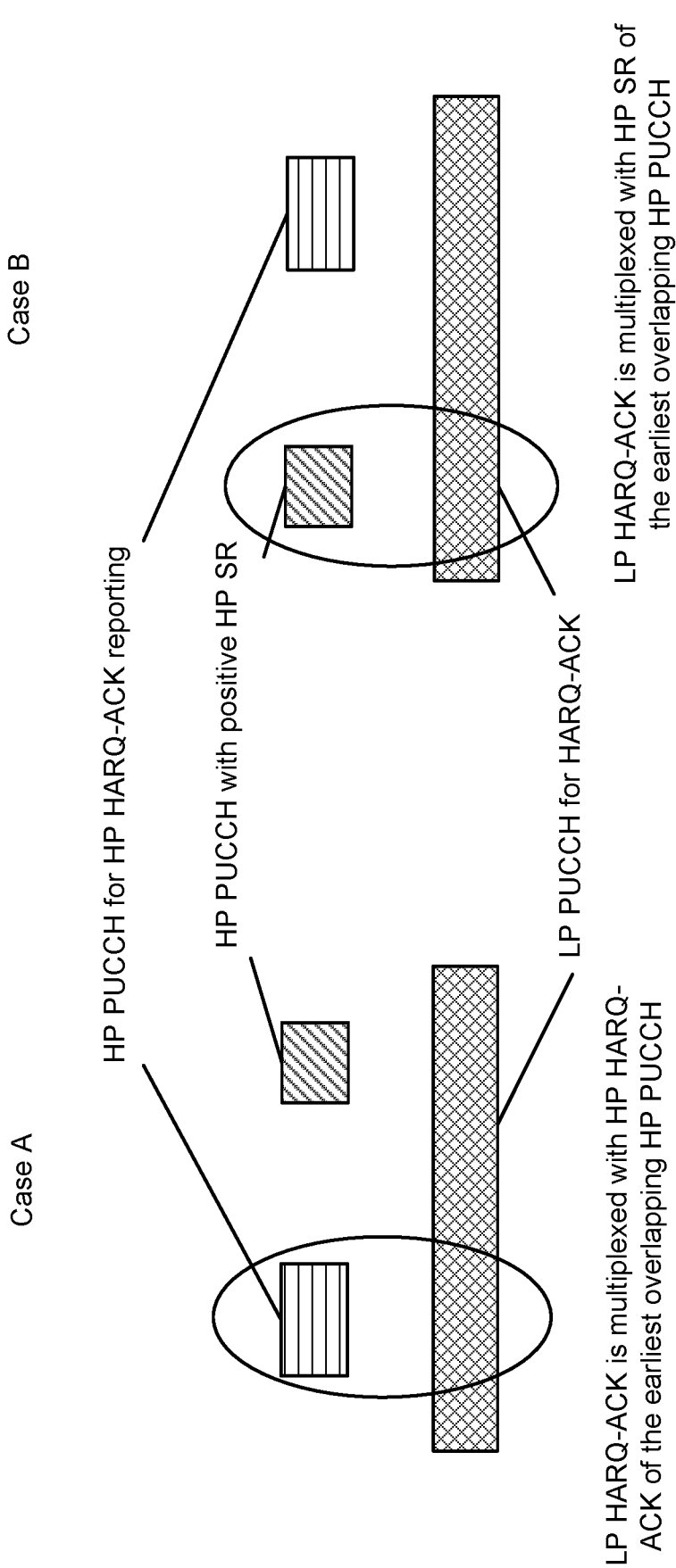
FIG. 13 is a diagram illustrating a LP HARQ-ACK being multiplexed with a HP UCI from the earliest overlapping HP PUCCH.

In this solution, the LP HARQ-ACK is multiplexed with the earliest overlapping HP PUCCH regardless of the UCI type on the HP PUCCH, i.e. the LP HARQ-ACK may be multiplexed with HP HARQ-ACK or HP SR, as shown in FIG. 13.

- If the PUCCH for HP HARQ-ACK is earlier (Case A in FIG. 13), the LP HARQ-ACK is multiplexed with the HP HARQ-ACK from the overlapping PUCCH, same as Method 1 above.
- If the PUCCH for a positive HP SR is earlier (Case B in FIG. 13), the LP HARQ-ACK is multiplexed with the HP SR.

However, not all cases may be supported for HP SR and LP HARQ-ACK multiplexing. And the LP PUCCH with LP HARQ-ACK may be dropped by the HP SR PUCCH. This will cause unnecessary loss of important UCI feedback. For example,

- If the LP HARQ-ACK is with PUCCH format 0 or 1 and the HP PUCCH for the positive HP SR is with PUCCH format 1, the LP HARQ-ACK is multiplexed on the HP SR PUCCH. Furthermore, if cyclic shift values can be used to represent the LP HARQ-ACK on a HP SR PUCCH resource with PUCCH format 0, the LP HARQ-ACK can also be multiplexed on the HP SR PUCCH resource.
- Otherwise, if the LP HARQ-ACK cannot be multiplexed on the HP SR PUCCH with positive HP SR, the LP PUCCH with the LP HARQ-ACK should be cancelled, And the HP PUCCH with HP HARQ-ACK and the HP PUCCH with positive HP SR are transmitted.

To avoid dropping of LP HARQ-ACK, alternatively or additionally, if the earlier channel with HP SR multiplexing with LP HARQ-ACK is not supported, the LP HARQ-ACK is allowed to multiplex with the HP HARQ-ACK of a later HP PUCCH for HP HARQ-ACK.

Solution 3: Based on LP HARQ-ACK Payload and the PUCCH Format for the Positive HP SR.

With this solution, the PUCCH resource is selected based on whether the LP HARQ-ACK can be multiplexed with the HP SR on a HP SR PUCCH resource. Note, the overlapping HP PUCCH with positive HP SR may be earlier than or later than the overlapping HP PUCCH with HP HARQ-ACK.

If the LP HARQ-ACK can be multiplexed on the HP PUCCH resource, it can simplify the UCI multiplexing process, so that the more complicated coding with HP HARQ-ACK and LP HARQ-ACK on a PUCCH will not be performed. Thus,

- If the LP HARQ-ACK is with PUCCH format 0 or 1 and the HP PUCCH for the positive HP SR is with PUCCH format 1, the LP HARQ-ACK is multiplexed on the HP SR PUCCH. Furthermore, if cyclic shift values can be used to represent the LP HARQ-ACK on a HP SR PUCCH resource with PUCCH format 0, the LP HARQ-ACK can also be multiplexed on the HP SR PUCCH resource.
- Otherwise, if the LP HARQ-ACK cannot be multiplexed on the HP SR PUCCH with positive HP SR, the LP HARQ-ACK is multiplexed with the HP HARQ-ACK on a HP HARQ-ACK PUCCH resource.

Solution 4: Depending on the Dynamic DCI Indication.

If dynamic indication of enabling/disabling UCI multiplexing with different priorities is supported, the DCI indication can only indicate multiplexing between HARQ-ACKs with different priorities. There is no DCI associated with a positive SR since it is triggered at UE side. Thus,

- If DCI indicates enabling multiplexing with HP HARQ-ACK, LP HARQ-ACK is multiplexed with HP HARQ-ACK on a HP PUCCH resource.
- Otherwise, if DCI indicates disabling multiplexing with HP HARQ-ACK, LP HARQ-ACK is multiplexed with HP SR whenever possible.
  - If the LP HARQ-ACK multiplexing on the HP SR PUCCH resource is supported, the LP HARQ-ACK is reported on the HP SR PUCCH.
  - If the LP HARQ-ACK multiplexing on the HP SR PUCCH resource is not supported for the given LP HARQ-ACK payload and LP PUCCH format, the LP PUCCH with the HARQ-ACK is cancelled. The HP PUCCH with the positive HP SR and the HP PUCCH with HP HARQ-ACK are transmitted.

The multiplexing and dropping behavior may further consider the locations of the HP PUCCH for HARQ-ACK and the PUCCH for the positive HP SR. The HP PUCCH for a position HP SR and the HP PUCCH for HARQ-ACK may be in different subslots. In some special cases, the HP PUCCH for a position HP SR and the HP PUCCH for HARQ-ACK may be in the same subslot, but not overlap with each other.

The same solutions as given above may be used in these special cases.

Alternatively, some special handling may be used to simplify the multiplexing process, e.g.

- If the HP PUCCH for HARQ-ACK and HP SR is in the same subslot, the HP SR and HP HARQ-ACK can be multiplexed together as if there is an overlapping between the HP PUCCHs, then multiplexed with the LP HARQ-ACK.
- If the HP PUCCH for HARQ-ACK and HP SR are in different subslots, the above solutions can be applied.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes, and variations may be made in the arrangement, operation, and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned implementations may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller, or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

As used herein, the term "and/or" should be interpreted to mean one or more items. For example, the phrase "A, B, and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

What is claimed is:
1. A user equipment (UE), comprising:
circuitry configured to:
  determine that a physical uplink control channel (PUCCH) with low priority (LP) overlaps with a high priority (HP) PUCCH carrying a HP hybrid automatic repeat request-acknowledgement (HARQ-ACK) and a HP PUCCH with a positive HP scheduling request (SR), wherein the HP PUCCH with HP HARQ-ACK does not overlap with the HP PUCCH with the positive HP SR;
  multiplex a LP HARQ-ACK only with the HP HARQ-ACK on a HP PUCCH resource configured for HP HARQ-ACK.
2. A user equipment (UE), comprising:
circuitry configured to:
  determine that a physical uplink control channel (PUCCH) with low priority (LP) overlaps with a high priority (HP) PUCCH carrying a HP hybrid automatic repeat request-acknowledgement (HARQ-ACK) and a HP PUCCH with a positive HP scheduling request (SR), wherein the HP PUCCH with HP HARQ-ACK does not overlap with the HP PUCCH with the positive HP SR;
  multiplex, based on a timeline, a LP HARQ-ACK with an uplink control information (UCI) of an earliest overlapping HP PUCCH.
3. A user equipment (UE), comprising:
circuitry configured to:
  determine that a physical uplink control channel (PUCCH) with low priority (LP) overlaps with a high priority (HP) PUCCH carrying a HP hybrid automatic repeat request-acknowledgement (HARQ-ACK) and a HP PUCCH with a positive HP scheduling request (SR), wherein the HP PUCCH with HP HARQ-ACK does not overlap with the HP PUCCH with the positive HP SR;
  multiplex, based on an LP HARQ-ACK payload and a PUCCH format for the positive HP SR, the LP HARQ-ACK on an HP SR PUCCH resource if there is up to 2 bits of LP HARQ-ACK and if multiplexing for a PUCCH combination between LP HARQ-ACK and HP SR is supported;
  multiplex the LP HARQ-ACK with the HP HARQ-ACK on a HP PUCCH resource configured for HP HARQ-ACK if there is more than 2 bits of LP

HARQ-ACK or if multiplexing for a PUCCH combination between LP HARQ-ACK and HP SR is not supported.

4. A user equipment (UE), comprising:
circuitry configured to:
  determine that a physical uplink control channel (PUCCH) with low priority (LP) overlaps with a high priority (HP) PUCCH carrying a HP hybrid automatic repeat request-acknowledgement (HARQ-ACK) and a HP PUCCH with a positive HP scheduling request (SR), wherein the HP PUCCH with HP HARQ-ACK does not overlap with the HP PUCCH with the positive HP SR;
  multiplex, if downlink control information (DCI) indicates enabling of multiplexing with a HP HARQ-ACK on an overlapping HP PUCCH for HARQ-ACK, the LP HARQ-ACK with the indicated HP HARQ-ACK on a HP PUCCH resource configured for HP HARQ-ACK;
  multiplex, if downlink control information (DCI) does not indicate enabling of multiplexing with a HP HARQ-ACK on an overlapping HP PUCCH for HARQ-ACK, the LP HARQ-ACK with the HP SR.

5. A base station (gNB), comprising:
circuitry configured to:
  determine that a physical uplink control channel (PUCCH) with low priority (LP) overlaps with a high priority (HP) PUCCH carrying a HP hybrid automatic repeat request-acknowledgement (HARQ-ACK) and a HP PUCCH with a positive HP scheduling request (SR), wherein the HP PUCCH with HP HARQ-ACK does not overlap with the HP PUCCH with the positive HP SR;
  receive the multiplexed LP HARQ-ACK and the HP HARQ-ACK on a HP PUCCH resource configured for HP HARQ-ACK.

6. A base station (gNB), comprising:
circuitry configured to:
  determine that a physical uplink control channel (PUCCH) with low priority (LP) overlaps with a high priority (HP) PUCCH carrying a HP hybrid automatic repeat request-acknowledgement (HARQ-ACK) and a HP PUCCH with a positive HP scheduling request (SR), wherein the HP PUCCH with HP HARQ-ACK does not overlap with the HP PUCCH with the positive HP SR;
  receive, based on a timeline, a multiplexed LP HARQ-ACK and an uplink control information (UCI) of an earliest overlapping HP PUCCH.

7. A base station (gNB), comprising:
circuitry configured to:
  determine that a physical uplink control channel (PUCCH) with low priority (LP) overlaps with a high priority (HP) PUCCH carrying a HP hybrid automatic repeat request-acknowledgement (HARQ-ACK) and a HP PUCCH with a positive HP scheduling request (SR), wherein the HP PUCCH with HP HARQ-ACK does not overlap with the HP PUCCH with the positive HP SR;
  receive, based on an LP HARQ-ACK payload and a PUCCH format for the positive HP SR, the multiplexed LP HARQ-ACK on an HP SR PUCCH resource if there is up to 2 bits of LP HARQ-ACK and if multiplexing for a PUCCH combination between LP HARQ-ACK and HP SR is supported;
  receive the multiplexed LP HARQ-ACK and the HP HARQ-ACK on an HP PUCCH resource configured for HP HARQ-ACK if there is more than 2 bits of LP HARQ-ACK or if multiplexing for a PUCCH combination between LP HARQ-ACK and HP SR is not supported.

8. A base station (gNB), comprising:
circuitry configured to:
  determine that a physical uplink control channel (PUCCH) with low priority (LP) overlaps with a high priority (HP) PUCCH carrying a HP hybrid automatic repeat request-acknowledgement (HARQ-ACK) and a HP PUCCH with a positive HP scheduling request (SR), wherein the HP PUCCH with HP HARQ-ACK does not overlap with the HP PUCCH with the positive HP SR;
  receive, if downlink control information (DCI) indicates enabling of multiplexing with a HP HARQ-ACK on an overlapping HP PUCCH for HARQ-ACK, the LP HARQ-ACK with the indicated HP HARQ-ACK on a HP PUCCH resource configured for HP HARQ-ACK;
  receive, if downlink control information (DCI) does not indicate enabling of multiplexing with a HP HARQ-ACK on an overlapping HP PUCCH for HARQ-ACK, the LP HARQ-ACK with the HP SR.

* * * * *